US012600095B2

(12) United States Patent
Pantoja et al.

(10) Patent No.: US 12,600,095 B2
(45) Date of Patent: Apr. 14, 2026

(54) FORMING JOINTS BETWEEN COMPOSITE COMPONENTS

(71) Applicant: The Boeing Company, Arlington, VA (US)

(72) Inventors: Marcos Pantoja, St. Louis, MO (US); Ying Shi, St. Louis, MO (US); Alexander M. Rubin, St. Louis, MO (US); Phillip John Crothers, Hampton East (AU)

(73) Assignee: The Boeing Company, Arlington, VA (US)

( * ) Notice: Subject to any disclaimer, the term of this patent is extended or adjusted under 35 U.S.C. 154(b) by 245 days.

(21) Appl. No.: 18/177,699

(22) Filed: Mar. 2, 2023

(65) Prior Publication Data

US 2024/0293978 A1 Sep. 5, 2024

(51) Int. Cl.
| | |
|---|---|
| *B29C 65/34* | (2006.01) |
| *B29K 71/00* | (2006.01) |
| *B29L 31/30* | (2006.01) |
| *B64C 1/00* | (2006.01) |
| *B64C 1/06* | (2006.01) |

(52) U.S. Cl.
CPC ...... *B29C 65/3456* (2013.01); *B29C 65/3468* (2013.01); *B29C 65/3492* (2013.01); *B64C 1/00* (2013.01); *B64C 1/069* (2013.01); *B29K 2071/00* (2013.01); *B29K 2995/0012* (2013.01);
(Continued)

(58) Field of Classification Search
CPC ............ B29C 65/3456; B29C 65/3468; B29C 65/3492; B29K 2995/0012; B29K 2995/0097; B29L 2031/3076; B32B 5/02; B32B 5/22; B32B 5/24; B32B 5/28; Y10T 442/131; Y10T 442/172; Y10T 442/2418;
(Continued)

(56) References Cited

U.S. PATENT DOCUMENTS

| | | |
|---|---|---|
| 5,643,390 A | 7/1997 | Don et al. |
| 11,952,099 B2 | 4/2024 | Blom-Schieber et al. |

(Continued)

FOREIGN PATENT DOCUMENTS

| | | |
|---|---|---|
| CA | 2392822 A1 | 1/2004 |
| DE | 102019106446 A1 * | 9/2020 |

(Continued)

OTHER PUBLICATIONS

Translation of DE102019106446A1 (description, abstract, claims). (Year: 2019).*

(Continued)

*Primary Examiner* — Catherine A. Simone
(74) *Attorney, Agent, or Firm* — Yee & Associates, P.C.

(57) ABSTRACT

Composite joints and methods of forming composite joints are presented. A composite joint comprising: a first composite component formed of one of a thermoset material or a first thermoplastic material; a second composite component formed of a thermoset material or a third thermoplastic material; a thermoplastic joining film formed of a second thermoplastic material between the first composite component and the second composite component, the second thermoplastic material different from the thermoset material, first thermoplastic material, and third thermoplastic material; and a carbon conductive layer in the thermoplastic joining film.

23 Claims, 19 Drawing Sheets

(52) U.S. Cl.
CPC .................. *B29K 2995/0097* (2013.01); *B29L 2031/3076* (2013.01)

(58) Field of Classification Search
CPC ... Y10T 428/24994; Y10T 428/249933; B64C 1/00; B64C 1/069
See application file for complete search history.

(56) References Cited

U.S. PATENT DOCUMENTS

| | | | |
|---|---|---|---|
| 2003/0186068 | A1 | 10/2003 | Taniguchi et al. |
| 2019/0061273 | A1 | 2/2019 | Linde et al. |
| 2019/0329464 | A1 | 10/2019 | Ikeda et al. |
| 2021/0102068 | A1 | 4/2021 | Said et al. |
| 2022/0250334 | A1 | 8/2022 | Zhao et al. |
| 2022/0266541 | A1 | 8/2022 | Shi et al. |
| 2022/0404106 | A1* | 12/2022 | Suzuki .................... B29C 43/18 |

FOREIGN PATENT DOCUMENTS

| | | | |
|---|---|---|---|
| EP | 2899231 | A1 | 7/2015 |
| EP | 3854834 | A1 | 7/2021 |
| KR | 100549211 | B1 | 2/2006 |
| WO | 2006006508 | A1 | 1/2006 |
| WO | 2017072007 | A1 | 5/2017 |
| WO | WO-2021106561 | A1 * | 6/2021 ............ F28D 21/00 |
| WO | 2022122881 | A1 | 6/2022 |

OTHER PUBLICATIONS

Shi et al., "Thermoplastic Joining Films and Methods for Joining Thermoplastic and Thermoset Composite Materials," U.S. Appl. No. 18/177,710, filed Mar. 2, 2023, 55 pages.
European Patent Office Extended Search Report, dated Oct. 7, 2024, regarding Application No. EP24155762.8, 8 pages.
Crevecoeur et al: "Binary Blends of Poly(Ether Ether Ketone) and Poly(Ether Imide). Miscibility, Crystallization Behavior, and Semicrystalline Morphology", Macromolecules, American Chemical Society, US, vol. 24, No. 5, Mar. 4, 1991 (Mar. 4, 1991), pp. 1190-1195, XP000219313, ISSN: 0024-9297, DOI: 10.1021/MA00005A034.
European Patent Office Extended Search Report, dated May 19, 2023, regarding Application No. EP22194863.1, 9 pages.
Harris J. E. et al: "Miscible blends of poly(aryl ether ketone)s and polyetherimides" Journal of Applied Polymer Science, vol. 35, No. 7, May 20, 1988 (May 20, 1988), pp. 1877-1891, XP93045720, US, ISSN: 0021-8995, DOI: 10.1002/app.1988.070350713.
European Patent Office Extended Search Report, dated Oct. 21, 2025, regarding Application No. EP25170664.4, 7 pages.
Office Action, dated Nov. 19, 2025, regarding USPTO Application No. 18/782,162, 17 pages.

* cited by examiner

500

402

410

406

420

412

418

502   422   414

404

416

408

700

704

709
706
707  708
705  711

702

718  720

719  717
716  714
715  713
710
712

800

702

704

706          708

802

718          720

804

714

716

710

900

1000

902

904

1004

1002

928

926

914

1600

1602　SPECIFICATION AND DESIGN

1604　MATERIAL PROCUREMENT

1606　COMPONENT AND SUBASSEMBLY MANUFACTURING

1608　SYSTEM INTEGRATION

1610　CERTIFICATION AND DELIVERY

1612　IN SERVICE

1614　MAINTENANCE AND SERVICE

1700

AIRCRAFT

1702　AIRFRAME　　INTERIOR　1706

SYSTEMS

PROPULSION SYSTEM　ELECTRICAL SYSTEM 1708　1712

HYDRAULIC SYSTEM　ENVIRONMENTAL SYSTEM 1710　1714

1704

FORMING JOINTS BETWEEN COMPOSITE COMPONENTS

BACKGROUND INFORMATION

1. Field

The present disclosure relates generally to composite manufacturing processes and more specifically to joining composite parts.

2. Background

Current methods of joining thermoplastic composite to thermoset composite parts are adhesive bonding and mechanical fastening. Fasteners in mechanical fastening add weight and process complexity due to drilling. The adhesive bonding approach utilizes aggressive surface preparation of thermoplastic composites such as plasma etching, which only yields an active surface for a limited time interval.

Therefore, it would be desirable to have a method and apparatus that takes into account at least some of the issues discussed above, as well as other possible issues.

SUMMARY

An embodiment of the present disclosure provides a composite joint. The composite joint comprises a first composite component formed of one of a thermoset material or a first thermoplastic material; a second composite component formed of a thermoset material or a third thermoplastic material; a thermoplastic joining film formed of a second thermoplastic material between the first composite component and the second composite component; and a carbon conductive layer in the thermoplastic joining film. The second thermoplastic material is different from the thermoset material, first thermoplastic material, and third thermoplastic material Another embodiment of the present disclosure provides a composite joint. The composite joint comprises a first composite component comprising a plurality of layers of a first thermoplastic material and a first surface comprising a second thermoplastic material, the second thermoplastic material having a second melting temperature lower than a first melting temperature of the first thermoplastic material; a second composite component comprising a plurality of layers of a third thermoplastic material and a second surface formed of the second thermoplastic material, the second thermoplastic material having a second melting temperature lower than a third melting temperature of the third thermoplastic material; and a carbon conductive layer positioned one of between the first surface and the second surface, within the first surface, or within the second surface.

Yet another embodiment of the present disclosure provides a composite joint. The composite joint comprises a first composite component comprising a first thermoplastic material having a first melting temperature; a second composite component comprising a thermoset material; a thermoplastic joining film between the first composite component and the second composite component; and a carbon conductive layer between the first composite component and the second composite component to heat the thermoplastic joining film. The thermoplastic joining film comprises a mixture of two thermoplastic materials having a second melting temperature lower than the first melting temperature A further embodiment of the present disclosure provides a method of forming a composite joint. A first composite component is positioned such that a carbon conductive layer and a thermoplastic material having a second melting temperature lower than a first melting temperature of the first composite component are between the first composite component and a second composite component. The thermoplastic material is heated to a joining temperature using the carbon conductive layer.

A yet further embodiment of the present disclosure provides a composite component. The composite component comprises a plurality of layers of a first thermoplastic material; a first surface formed of a thermoplastic joining film comprising a second thermoplastic material consolidated onto the plurality of layers of the first thermoplastic material, the second thermoplastic material having a second melting temperature lower than a first melting temperature; and an additional surface formed of an additional thermoplastic joining film having a different composition than the thermoplastic joining film, the additional thermoplastic joining film consolidated onto the plurality of layers of the first thermoplastic material, the additional thermoplastic joining film having a respective melting temperature lower than the first melting temperature.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative examples recognize and take into account one or more different considerations. For example, the illustrative examples recognize and take into account that it would be desirable to provide methods of joining composite materials with at least one of less weight or with less complicated surface preparation.

Figure 1:
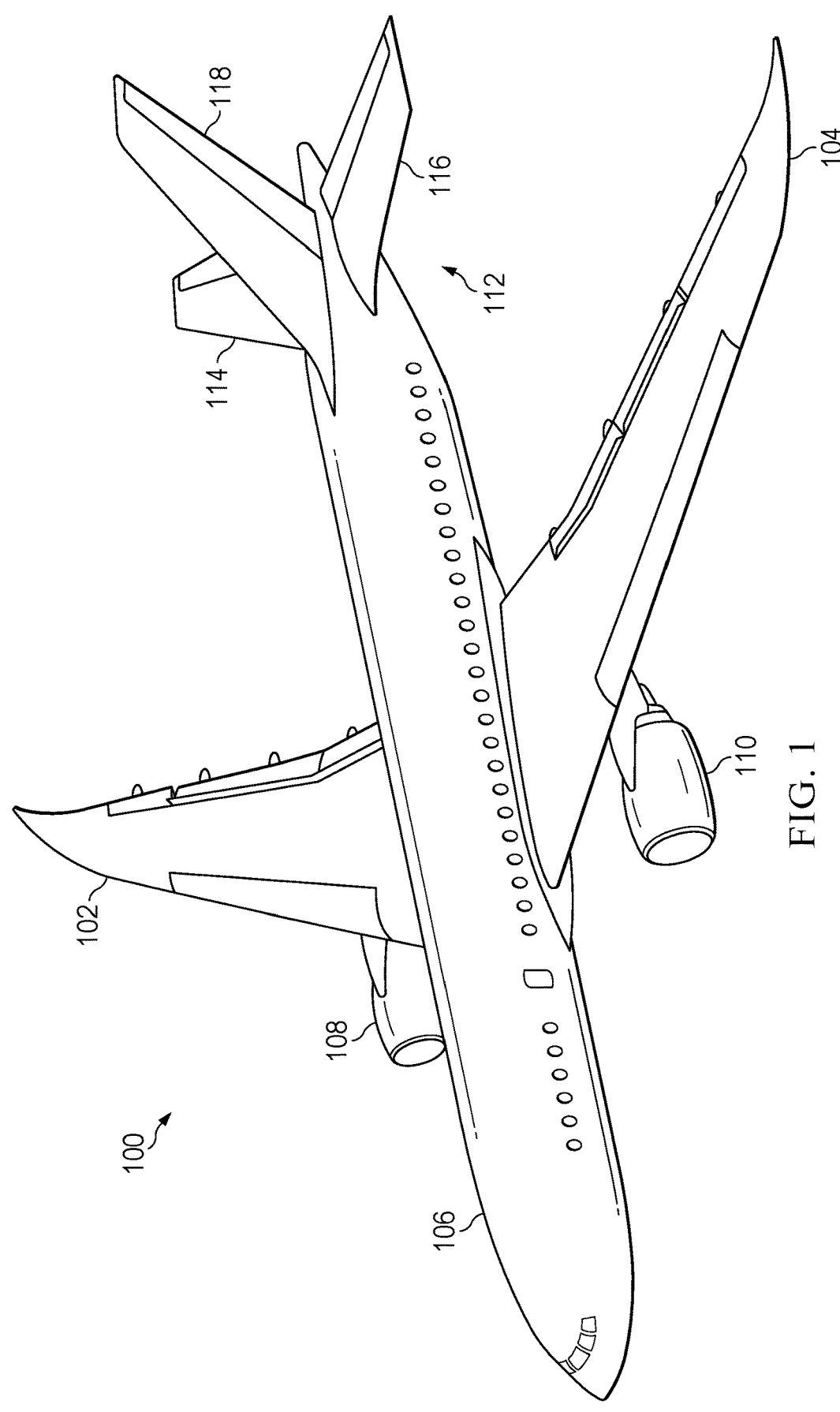
FIG. 1 is an illustration of an aircraft in accordance with an illustrative embodiment.

Turning now to FIG. 1, an illustration of an aircraft is depicted in accordance with an illustrative embodiment. Aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft in which thermoplastic joining films can be used to form joints between composite parts. Aircraft 100 is an example of an aircraft in which carbon conductive layer can be used to heat a thermoplastic joining film to form a joint between composite parts.

Figure 2:
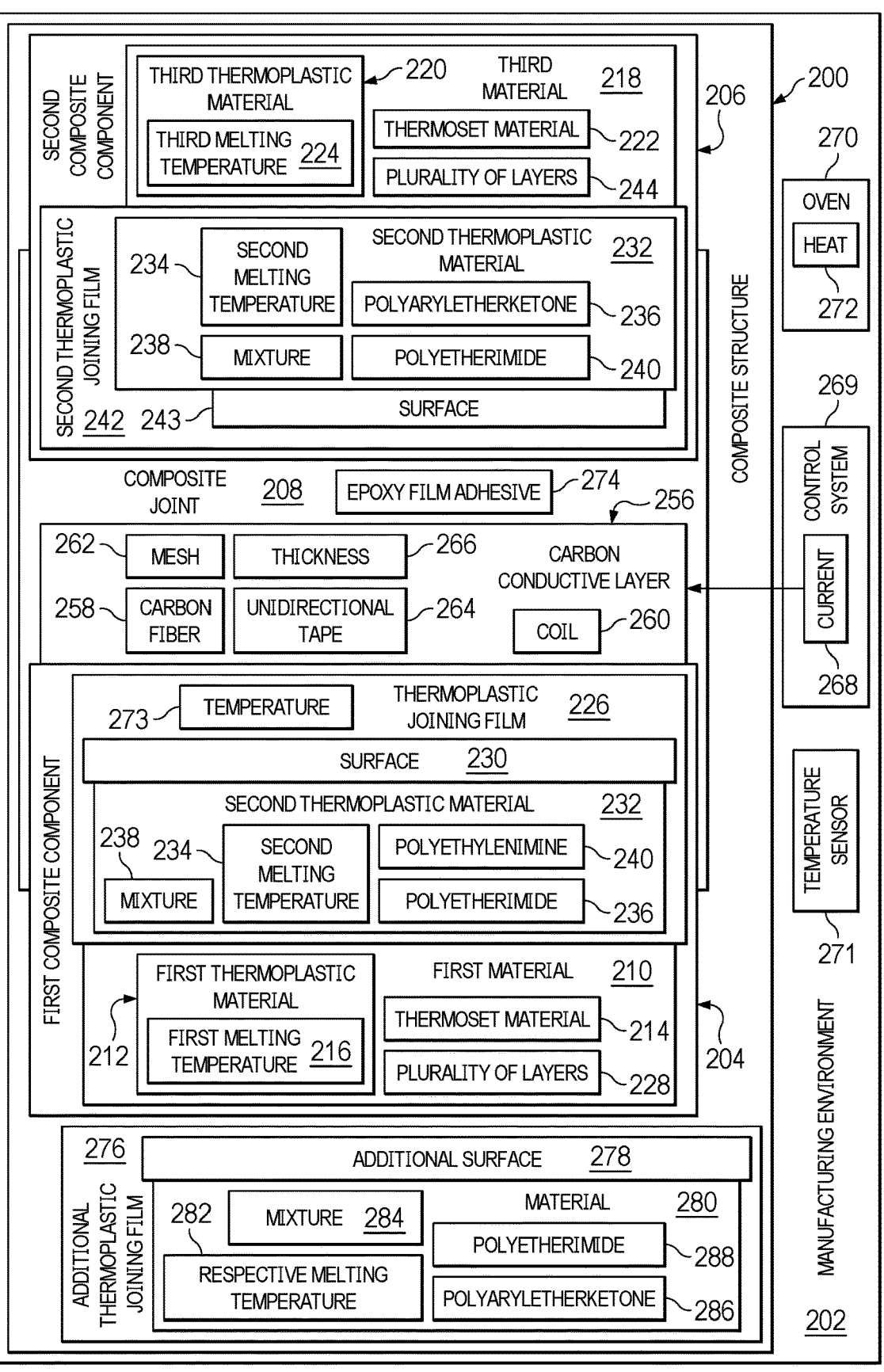
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. Composite structure 200 can be joined together in manufacturing environment 202. Composite structure 200 comprises first composite component 204 joined to second composite component 206 by composite joint 208. First composite component 204 comprises first material 210. First material 210 can be either first thermoplastic material 212 or thermoset material 214. When first material 210 is first thermoplastic material 212, first thermoplastic material 212 has first melting temperature 216.

Second composite component 206 comprises third material 218. Third material 218 can take the form of either third thermoplastic material 220 or thermoset material 222. When third material 218 is third thermoplastic material 220, third thermoplastic material 220 has third melting temperature 224.

Composite joint 208 is formed between first composite component 204 and second composite component 206.

Composite joint 208 includes a thermoplastic joining film that is melted at a lower temperature than that of both first melting temperature 216 and third melting temperature 224. By having a lower melting temperature than first melting temperature 216 and third melting temperature 224, consolidation is maintained in first material 210 and third material 218 while composite joint 208 is formed.

In some illustrative examples, the thermoplastic joining film is consolidated to a respective composite component prior to being positioned for joining. In some illustrative examples, thermoplastic joining film 226 is consolidated against plurality of layers 228 of first material 210. In some illustrative examples, second thermoplastic joining film 242 is consolidated against plurality of layers 244 of third material 218.

Thermoplastic joining film 226 can take any desirable form with second melting temperature 234 less than first melting temperature 216 and third melting temperature 224. Second melting temperature of second thermoplastic material 232 is configured such that first material 210 and third material 218 remain consolidated during joining of first composite component 204 and second composite component 206. Thermoplastic joining film 226 can have any desirable thickness. In some illustrative examples, the thickness of thermoplastic joining film 226 is in the range of about 0.001" to about 0.02".

In some illustrative examples, second thermoplastic material 232 is a polyaryletherketone 236. In some illustrative examples, second thermoplastic material 232 is a mixture 238 of two thermoplastic materials. In some illustrative examples, second thermoplastic material 232 is a mixture 238 of polyetherimide 240 and polyaryletherketone 236. In some illustrative examples, polyaryletherketone has second melting temperature 234 in a range of 260-350 degrees Celsius. Second melting temperature 234 can be used to co-consolidate thermoplastic joining film 226 with another thermoplastic material, such as first composite component 204. Second melting temperature 234 can be used to join thermoplastic joining film 226 to additional thermoplastic joining films, such as second thermoplastic joining film 242.

In some illustrative examples, mixture 238 of two thermoplastic materials has second melting temperature 234 in range of 260-350 degrees Celsius and a glass transition temperature in a range of 180-200 degrees Celsius. The glass transition temperature can be used to join thermoplastic joining film 226 to thermoset materials, such as when second composite component 206 is formed of thermoset material 222. In some illustrative examples, thermoplastic joining film 226 is mixture 238 when at least one of first composite component 204 or second composite component 206 is formed of a thermoset material.

In some illustrative examples, a thermoplastic joining film, such as thermoplastic joining film 226, that will join a thermoset composite component and a thermoplastic composite component, is a mixture of two thermoplastic materials. In some illustrative examples, a thermoplastic joining film, such as thermoplastic joining film 226, that will join two thermoplastic composite components, is a single thermoplastic material with second melting temperature 234.

In some illustrative examples, composite joint 208 is formed by a single layer of thermoplastic joining film, such as thermoplastic joining film 226 or second thermoplastic joining film 242. In some illustrative examples, composite joint 208 is formed of multiple layers of thermoplastic joining film. In some illustrative examples, second thermoplastic joining film 242 is consolidated against plurality of layers 244 of third thermoplastic material 220 to form second surface 243 of second composite component 206. Second thermoplastic joining film 242 can take any desirable form with second melting temperature 234 less than first melting temperature 216 and third melting temperature 224. In some illustrative examples, second thermoplastic joining film 242 is mixture 238 when at least one of first composite component 204 or second composite component 206 is formed of a thermoset material.

In some illustrative examples, composite joint 208 comprises first composite component 204 formed of one of thermoset material 214 or first thermoplastic material 212; second composite component 206 formed of thermoset material 222 or third thermoplastic material 220; thermoplastic joining film 226 formed of second thermoplastic material 232 between first composite component 204 and second composite component 206; and carbon conductive layer 256 in thermoplastic joining film 226. Second thermoplastic material 232 is different from thermoset material 214, first thermoplastic material 212, and third thermoplastic material 220.

In these illustrative examples, second thermoplastic material 232 has second melting temperature 234 lower than first melting temperature 216 of first thermoplastic material 212 when first composite component 204 is formed of first thermoplastic material 212. Second melting temperature 234 is lower third melting temperature 224 of third thermoplastic material 220 when second composite component 206 is formed of third thermoplastic material 220.

In some illustrative examples, first composite component 204 is a stiffener and second composite component 206 is a skin. In some illustrative examples, first composite component 204 is a bracket and second composite component 206 is a stiffener.

In some illustrative examples, thermoplastic joining film 226 has been consolidated into one of first composite component 204 or second composite component 206. In some illustrative examples, second thermoplastic joining film 242, is in contact with the thermoplastic joining film. In these illustrative examples, second thermoplastic joining film 242 is consolidated into the other of first composite component 204 or second composite component 206.

In some illustrative examples, composite joint 208 comprises first composite component 204, second composite component 206, and carbon conductive layer 256. First composite component 204 comprises plurality of layers 228 of first thermoplastic material 212 and first surface 230 comprising second thermoplastic material 232, second thermoplastic material 232 having second melting temperature 234 lower than first melting temperature 216 of first thermoplastic material 212. Second composite component 206 comprising plurality of layers 244 of third thermoplastic material 220 and second surface 243 formed of second thermoplastic material 232, second thermoplastic material 232 having second melting temperature 234 lower than third melting temperature 224 of third thermoplastic material 220. Carbon conductive layer 256 is positioned one of between first surface 230 and second surface 243, within first surface 230, or within second surface 243.

In some illustrative examples, first thermoplastic material 212 is one of polyetherketoneketone (PEKK), polyetheretherketone (PEEK), or a blend of polyetheretherketone (PEEK) and polyetherketoneketone (PEKK). In some illustrative examples, third thermoplastic material 220 is one of polyetherketoneketone (PEKK), polyetheretherketone (PEEK), or a blend of polyetheretherketone (PEEK) and polyetherketoneketone (PEKK).

Carbon conductive layer 256 is present in composite structure 200 to melt second thermoplastic material 232 to join first composite component 204 and second composite component 206. In some illustrative examples, carbon conductive layer 256 is a one of mesh 262, coil 260, or unidirectional tape 264. In some illustrative examples, carbon fiber 258 in carbon conductive layer 256 generates heat to melt second thermoplastic material 232. In some illustrative examples, carbon conductive layer 256 has thickness 266 in a range of 0.005" to 0.02".

Carbon conductive layer 256 produces heat when current 268 is applied to carbon conductive layer 256. In some illustrative examples, in addition to current 268 applied to carbon conductive layer 256, heat 272 can also be applied by oven 270. In some illustrative examples, carbon conductive layer 256 can be optional.

Control system 269 is present to control application of current 268. In some illustrative examples, current 268 is controlled based on a feedback control loop. Temperature sensor 271 is present to monitor temperature 273 of thermoplastic joining film 226. Control system 269 is configured to control current 268 applied to carbon conductive layer 256 based on temperature 273 of thermoplastic joining film 226.

In some illustrative examples, composite joint 208 comprises first composite component 204 comprising first thermoplastic material 212 having first melting temperature 216; second composite component 206 comprising thermoset material 214; and a thermoplastic joining film between the first composite component 204 and second composite component 206. The thermoplastic joining film, at least one of thermoplastic joining film 226 or second thermoplastic material 232, comprises a mixture of two thermoplastic materials having second melting temperature 234 lower than first melting temperature 216.

In some illustrative examples, thermoplastic joining film 226 is in contact with first composite component 204, and composite joint 200 further comprises second thermoplastic joining film 242 and epoxy film adhesive 274. Second thermoplastic joining film 242 is in contact with second composite component 206. Second thermoplastic joining film 242 is formed of mixture 238 of the two thermoplastic materials. Epoxy film adhesive 274 is positioned between thermoplastic joining film 226 and second thermoplastic joining film 242.

In some illustrative examples, mixture 238 of the two thermoplastic materials has diffused into epoxy film adhesive 274. In these illustrative examples, epoxy film adhesive 274 has diffused into thermoplastic joining film 226 and second thermoplastic joining film 242.

In some illustrative examples, second thermoplastic joining film 242 was consolidated to second composite component 206 to form second surface 243 of second composite component 206.

In some illustrative examples, thermoplastic joining film 226 is in contact with first composite component 204, and composite joint 200 further comprises epoxy film adhesive 274 positioned between thermoplastic joining film 226 and second composite component 206. In some of these illustrative examples, thermoplastic joining film 226 comprises mixture 238 of the two thermoplastic materials. In some illustrative examples, epoxy film adhesive 274 has diffused into thermoplastic joining film 226 and mixture 238 of the two thermoplastic materials has diffused into epoxy film adhesive 274. In some illustrative examples, the two thermoplastic materials comprise polyetherimide 240 and a polyaryletherketone 236. In some illustrative examples, mixture 238 of the two thermoplastic materials has diffused into second composite component 206. In some illustrative example, thermoplastic joining film was consolidated to first composite component 204 to form surface 230 of first composite component 204.

In some illustrative examples, a composite component can be joined to multiple other components. For example, first composite component 204 can be joined to second composite component 206 and another composite component. Thermoplastic joining film 226 is positioned to join first composite component 204 to second composite component 206. Thermoplastic joining film 226 forms surface 230.

In some illustrative examples, first composite component 204 further comprises additional thermoplastic joining film 276. Additional thermoplastic joining film 276 forms additional surface 278 to join first composite component 204 to an additional composite component. Additional thermoplastic joining film 276 is formed of material 280. Additional thermoplastic joining film 276 has respective melting temperature 282 lower than first melting temperature 216. In some illustrative examples, material 280 is mixture 284 of two thermoplastic materials. Additional thermoplastic joining film 276 can include at least one of polyetherimide 288 or polyaryletherketone 286.

In some illustrative examples, thermoplastic joining film 226 and additional thermoplastic joining film 276 are formed of different thermoplastic materials. In some illustrative examples, one of thermoplastic joining film 226 and additional thermoplastic joining film 276 is configured to join first composite component 204 to a thermoset material while the other of thermoplastic joining film 226 and additional thermoplastic joining film 276 is configured to join first composite component 204 to a thermoplastic material.

The illustration of manufacturing environment 202 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, carbon conductive layer 256 can be formed of a carbon preform of any desirable construction. As another example, an additional composite component (not depicted) can be joined to first composite component by additional thermoplastic joining film 276.

Figure 3:
FIG. 3 is an illustration of a cross-sectional view of two composite parts in accordance with an illustrative embodiment.
Figure 3:
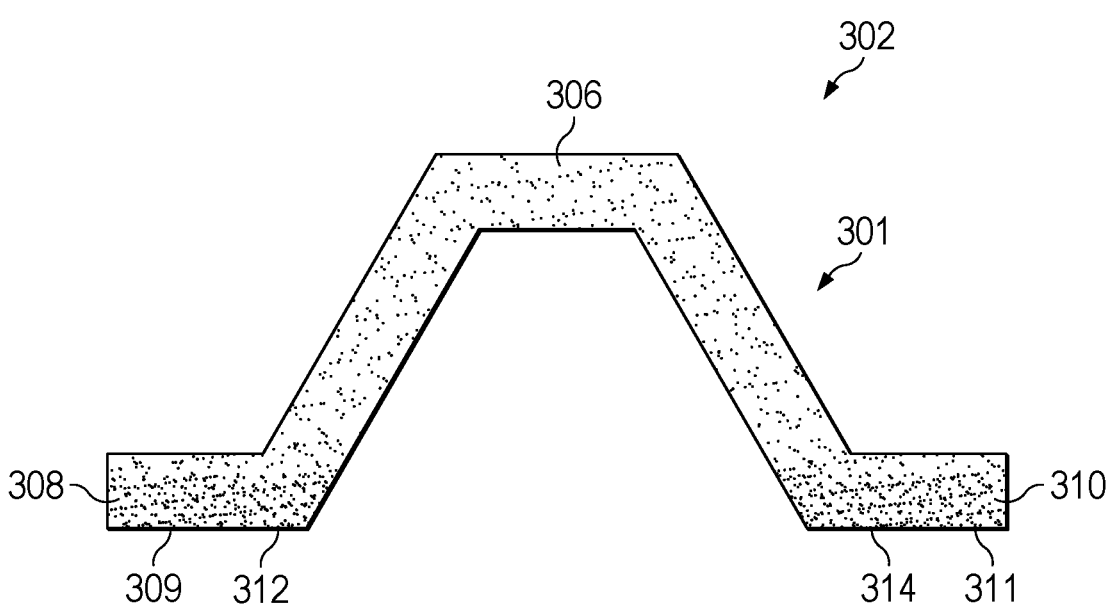
Figure 3:
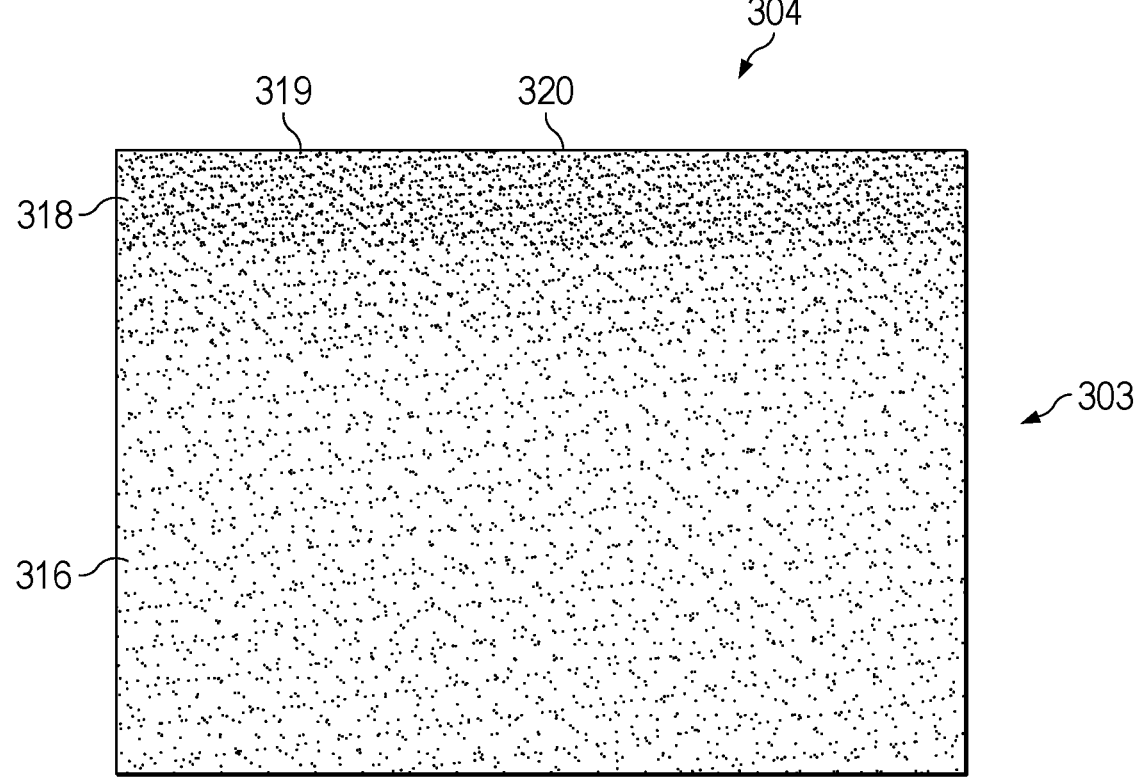

Turning now to FIG. 3, an illustration of a cross-sectional view of two composite parts is depicted in accordance with an illustrative embodiment. In view 300, first composite component 302 and second composite component 304 are visible. First composite component 302 is a physical implementation of first composite component 204 of FIG. 2. Second composite component 304 is a physical implementation of second composite component 206 of FIG. 2.

First composite component 302 takes the form of hat-shaped stiffener 301 while second composite component 304 takes the form of skin 303. First composite component 302 comprises a plurality of layers of first thermoplastic material 306 and portions of a second thermoplastic material. First thermoplastic material 306 has a first melting temperature. In some illustrative examples, first thermoplastic material 306 is one of polyetherketoneketone (PEKK), polyetherketone (PEEK), or a blend of polyetheretherketone (PEEK) and polyetherketoneketone (PEKK). In some illustrative examples, first thermoplastic material 306 is polyaryletherketone. In this illustrative example, the portions of second thermoplastic material include second thermoplastic material 308 and second thermoplastic material 310 forming legs of hat-shaped stiffener 301. Second thermoplastic material 308 and second thermoplastic material 310 have a second melting temperature. The second melting temperature is lower than the first melting temperature of first thermoplastic material 306.

Thermoplastic joining film 309 is formed by second thermoplastic material 308. Thermoplastic joining film 311 is formed by second thermoplastic material 310. Thermoplastic joining film 309 and thermoplastic joining film 311 can be used to form a joint between first composite component 302 and second composite component 304.

Second thermoplastic material 308 forms surface 312 of first composite component 302. Surface 312 is a surface of a first leg of hat-shaped stiffener 301. Second thermoplastic material 310 forms surface 314 of first composite component 302. Surface 314 is a surface of a second leg of hat-shaped stiffener 301.

To form surface 312, second thermoplastic material 308 was consolidated with first thermoplastic material 306. To form surface 314, second thermoplastic material 310 was consolidated with first thermoplastic material 306. The consolidation step can be performed by any desirable tooling or method. In some illustrative examples, consolidation can be performed using at least one of continuous compression molding (CCM), stamp forming, or an autoclave. The consolidation is performed at a temperature higher than the second melting temperature of second thermoplastic material 308 and second thermoplastic material 310.

Second composite component 304 comprises third thermoplastic material 316 and second thermoplastic material 318. Second thermoplastic material 318 has the second melting temperature. The second melting temperature is lower than the third melting temperature of third thermoplastic material 316.

Thermoplastic joining film 319 is formed by second thermoplastic material 318. Surface 320 of second composite component 304 is formed by consolidating second thermoplastic material 318 and third thermoplastic material 316. The consolidation step can be performed by any desirable tooling or method. In some illustrative examples, consolidation can be performed using at least one of CCM, stamp forming, or an autoclave. The consolidation is performed at a temperature higher than the second melting temperature of second thermoplastic material 318.

To join first composite component 302 and second composite component 304, a respective carbon conductive layer (not depicted) is positioned between each thermoplastic joining film of first composite component 302 and thermoplastic joining film 319 of second composite component 304. For example, a carbon conductive layer (not depicted) can be positioned between thermoplastic joining film 309 and thermoplastic joining film 319. A carbon conductive layer (not depicted) can be positioned between thermoplastic joining film 311 and thermoplastic joining film 319. A carbon conductive layer can be used to heat the second thermoplastic material to the second melting temperature to join first composite component 302 and second composite component 304 without melting first thermoplastic material 306 or third thermoplastic material 316.

Figure 4:
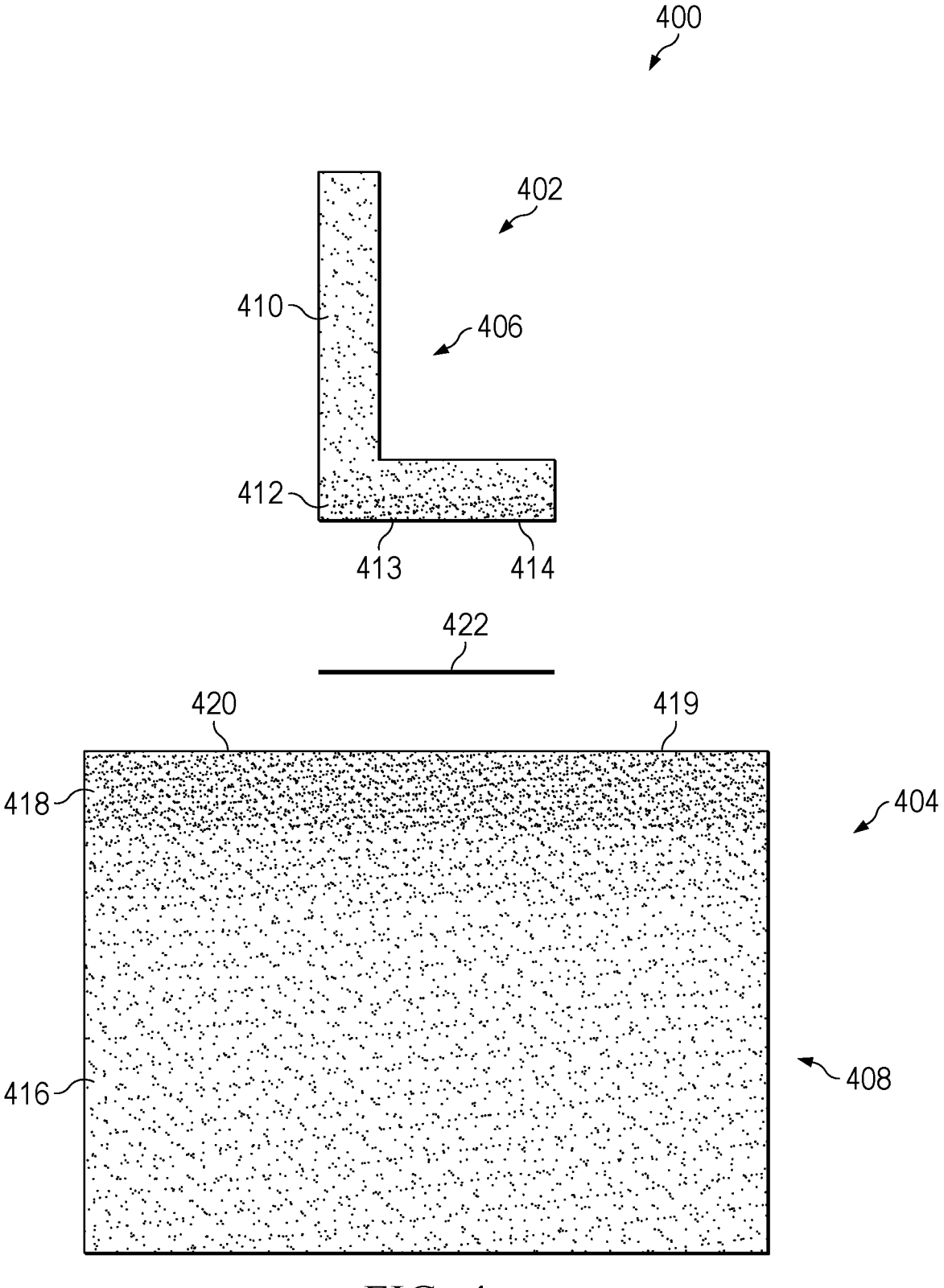
FIG. 4 is an illustration of a cross-sectional view of two composite parts and a conductive layer in accordance with an illustrative embodiment.

Turning now to FIG. 4, an illustration of a cross-sectional view of two composite parts and a conductive layer is depicted in accordance with an illustrative embodiment. In view 400, first composite component 402 and second composite component 404 are visible. First composite component 402 is a physical implementation of first composite component 204 of FIG. 2. Second composite component 404 is a physical implementation of second composite component 206 of FIG. 2.

First composite component 402 takes the form of L-shaped stiffener 406 while second composite component 404 takes the form of skin 408. First composite component 402 comprises a plurality of layers of first thermoplastic material 410 and second thermoplastic material 412. First thermoplastic material 410 has a first melting temperature. In some illustrative examples, first thermoplastic material 410 is one of polyetherketoneketone (PEKK), polyetheretherketone (PEEK), or a blend of polyetheretherketone (PEEK) and polyetherketoneketone (PEKK). In some illustrative examples, first thermoplastic material 401 is one of polyaryletherketone (PEKK), polyetheretherketone (PEEK), or a blend of polyetheretherketone (PEEK) and polyetherketoneketone (PEEK). Second thermoplastic material 412 has a second melting temperature. The second melting temperature is lower than the first melting temperature of first thermoplastic material 410.

Thermoplastic joining film 413 is formed by second thermoplastic material 412. Thermoplastic joining film 413 can be used to form a joint between first composite component 402 and second composite component 404.

Second thermoplastic material 412 forms surface 414 of first composite component 402. To form surface 414, second thermoplastic material 412 was consolidated with first thermoplastic material 410. In some illustrative examples, second thermoplastic material 412 is a single thermoplastic material.

Second composite component 404 comprises third thermoplastic material 416 and second thermoplastic material 418. Second thermoplastic material 418 has the second melting temperature. The second melting temperature is lower than the third melting temperature of third thermoplastic material 416.

Thermoplastic joining film 419 is formed by second thermoplastic material 418. Surface 420 of second composite component 404 is formed by consolidating second thermoplastic material 418 and third thermoplastic material 416.

To join first composite component 402 and second composite component 404, carbon conductive layer 422 is positioned between thermoplastic joining film 413 of first composite component 402 and thermoplastic joining film 419 of second composite component 404. In this illustrative example, carbon conductive layer 422 is positioned between surface 414 and surface 420. Carbon conductive layer 422 can be used to heat second thermoplastic material 412 and second thermoplastic material 418 to the second melting temperature to join first composite component 402 and second composite component 404 without melting first thermoplastic material 410 or third thermoplastic material 416.

Carbon conductive layer 422 takes any desirable form. In some illustrative examples, carbon conductive layer 422 takes the form of at least one of a coil, a mesh, or a unidirectional tape.

Figure 5:
FIG. 5 is an illustration of a cross-sectional view of a joint formed between two composite parts using a conductive layer in accordance with an illustrative embodiment.

Turning now to FIG. 5, an illustration of a cross-sectional view of a joint formed between two composite parts using a conductive layer is depicted in accordance with an illustrative embodiment. View 500 is a view of joint 502 connecting first composite component 402 and second composite component 404. In this illustrative example, carbon conductive layer 422 has heated second thermoplastic material 412 and second thermoplastic material 418 to the second melting temperature to form joint 502.

After forming joint 502, carbon conductive layer 422 remains in joint 502. Carbon conductive layer 422 remains in the resulting structure.

In some illustrative examples, consolidation is performed to form joint 502. In some illustrative examples, the consolidation is performed at a temperature in the range of 260 degrees Celsius to 350 degrees Celsius. In some illustrative examples, the heat is provided by carbon conductive layer 422. In some illustrative examples, the heat is provided by a combination of carbon conductive layer 422 and an oven.

Figure 6:
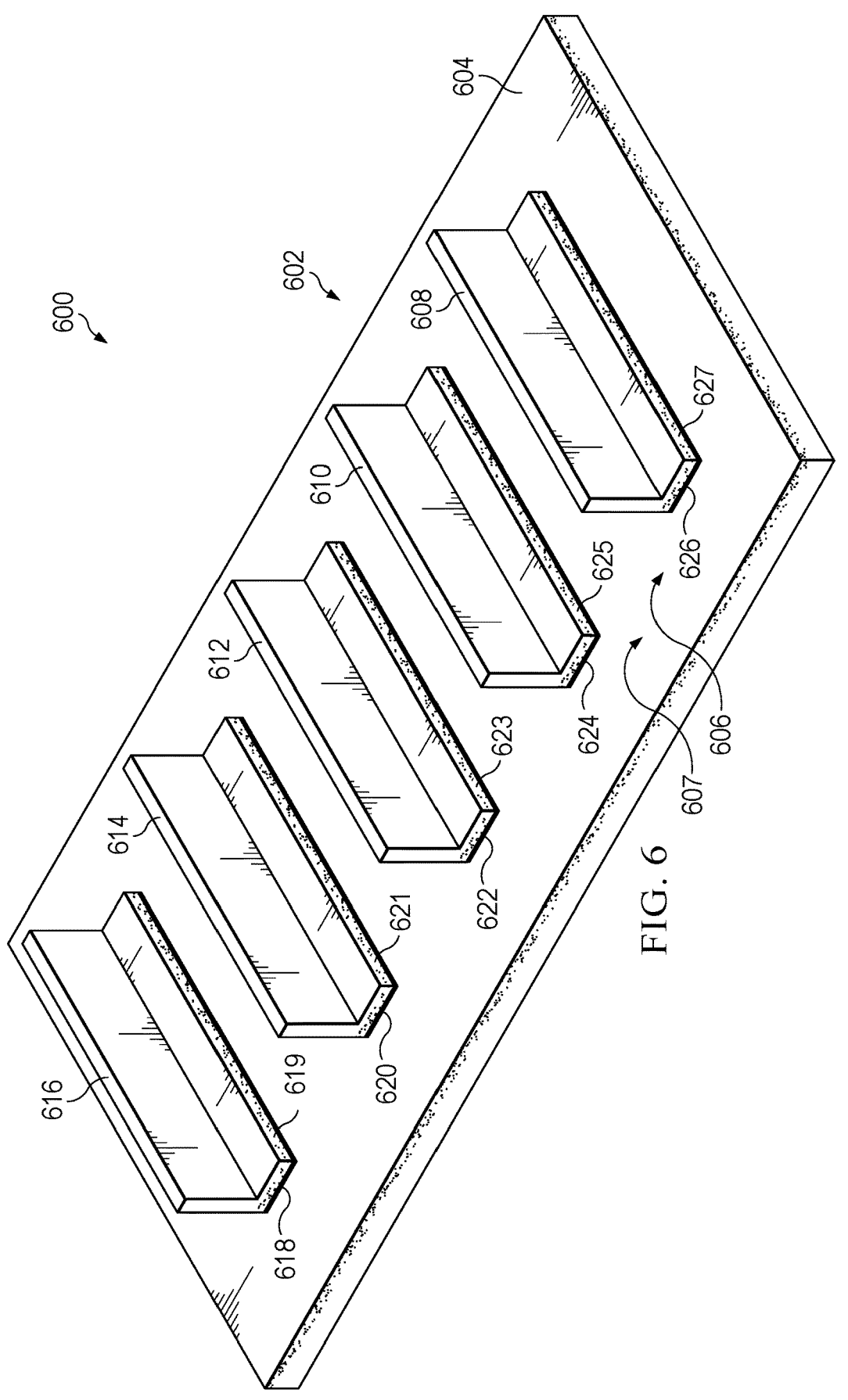
FIG. 6 is an illustration of an isometric view of composite stiffeners joined to a composite skin using conductive layers in accordance with an illustrative embodiment.

Turning now to FIG. 6, an illustration of an isometric view of composite stiffeners joined to a composite skin using conductive layers is depicted in accordance with an illustrative embodiment. In view 600, plurality of stiffeners 602 and skin 604 are present. Skin 604 is a physical implementation of second composite component 206 of FIG. 2. Skin 604 comprises surface 606 formed of thermoplastic joining film 607. Each of plurality of stiffeners 602 can be an implementation of first composite component 204 of FIG. 2. In some illustrative examples, skin 604 and each of plurality of stiffeners 602 is formed of a respective thermoplastic materials.

Plurality of stiffeners 602 comprises stiffener 608, stiffener 610, stiffener 612, stiffener 614, and stiffener 616. Each stiffener of plurality of stiffeners 602 comprises a second thermoplastic material. For example, carbon conductive layer 618 is between thermoplastic joining film 607 and second thermoplastic material 619 of stiffener 616. Carbon conductive layer 618 is configured to heat thermoplastic joining film 607 and second thermoplastic material 619 to join stiffener 616 to skin 604. Carbon conductive layer 620 is between thermoplastic joining film 607 and second thermoplastic material 621 of stiffener 614. Carbon conductive layer 620 is configured to heat thermoplastic joining film 607 and second thermoplastic material 621 to join stiffener 614 to skin 604.

Carbon conductive layer 622 is between thermoplastic joining film 607 and second thermoplastic material 623 of stiffener 612. Carbon conductive layer 622 is configured to heat thermoplastic joining film 607 and second thermoplastic material 623 to join stiffener 612 to skin 604.

Carbon conductive layer 624 is between thermoplastic joining film 607 and second thermoplastic material 625 of stiffener 610. Carbon conductive layer 624 is configured to heat thermoplastic joining film 607 and second thermoplastic material 625 to join stiffener 610 to skin 604.

Carbon conductive layer 626 is between thermoplastic joining film 607 and second thermoplastic material 627 of stiffener 608. Carbon conductive layer 626 is configured to heat thermoplastic joining film 607 and second thermoplastic material 627 to join stiffener 608 to skin 604.

Figure 7:
FIG. 7 is an illustration of a cross-sectional view of two composite parts and conductive layers in accordance with an illustrative embodiment.
Figure 7:
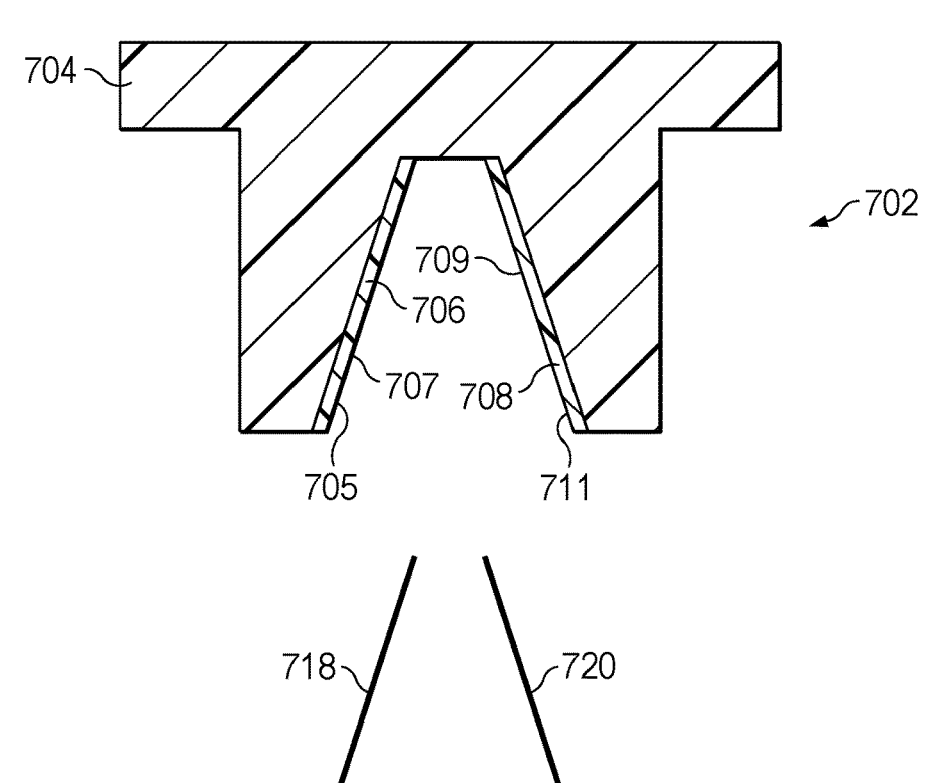
Figure 7:
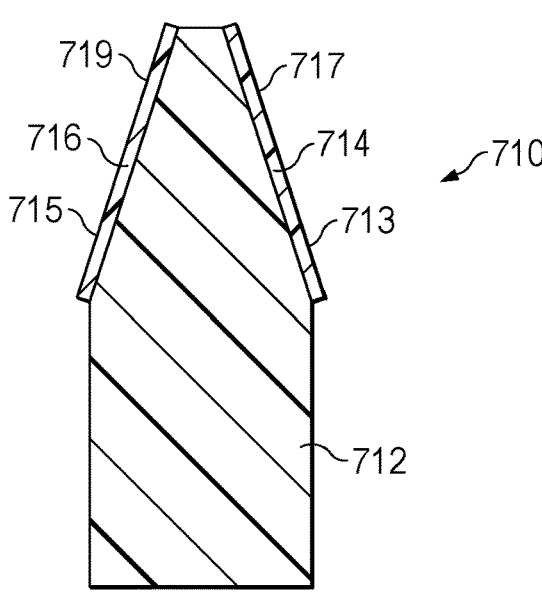

Turning now to FIG. 7, an illustration of a cross-sectional view of two composite parts and conductive layers is depicted in accordance with an illustrative embodiment. In view 700, first composite component 702 and second composite component 710 are visible. First composite component 702 is a physical implementation of first composite component 204 of FIG. 2. Second composite component 710 is a physical implementation of second composite component 206 of FIG. 2.

First composite component 702 takes the form of a bracket having a tapered shape. First composite component 702 comprises a plurality of layers of first thermoplastic material 704 and portions of a second thermoplastic material. First thermoplastic material 704 has a first melting temperature. In this illustrative example, the portions of second thermoplastic material include second thermoplastic material 706 and second thermoplastic material 708.

Second thermoplastic material 706 and second thermoplastic material 708 have a second melting temperature. The second melting temperature is lower than the first melting temperature of first thermoplastic material 704. In some illustrative examples, first thermoplastic material 704 is one of polyetherketoneketone (PEKK), polyetheretherketone (PEEK), or a blend of polyetheretherketone (PEEK) and polyetherketoneketone (PEKK). In some illustrative examples, first thermoplastic material 704 is polyaryletherketone.

Thermoplastic joining film 707 is formed by second thermoplastic material 706. Thermoplastic joining film 709 is formed by second thermoplastic material 708. Thermoplastic joining film 707 and thermoplastic joining film 709 can be used to form a joint between first composite component 702 and second composite component 710.

Second thermoplastic material 706 forms surface 705 of first composite component 702. Second thermoplastic material 708 forms surface 711 of first composite component 702. In this illustrative example, surface 705 and surface 711 are tapered. To form surface 705, second thermoplastic material 706 was consolidated with first thermoplastic material 704. To form surface 711, second thermoplastic material 708 was consolidated with first thermoplastic material 704. The consolidation step can be performed by any desirable tooling or method. In some illustrative examples, consolidation can be performed using at least one of CCM, stamp forming, or an autoclave. The consolidation is performed at a temperature higher than the second melting temperature of second thermoplastic material 706 and second thermoplastic material 708.

Second composite component 710 comprises third thermoplastic material 712 and a second thermoplastic material. In this illustrative example, second composite component 710 comprises second thermoplastic material 714 and second thermoplastic material 716. Second thermoplastic material 714 and second thermoplastic material 716 have the second melting temperature. The second melting temperature is lower than the third melting temperature of third thermoplastic material 712.

Thermoplastic joining film 713 is formed by second thermoplastic material 714. Surface 717 of second composite component 710 is formed by consolidating second thermoplastic material 714 and third thermoplastic material 712. In this illustrative example, surface 717 and surface 719 are tapered.

Thermoplastic joining film 715 is formed by second thermoplastic material 716. Surface 719 of second composite component 710 is formed by consolidating second thermoplastic material 716 and third thermoplastic material 712. The consolidation step can be performed by any desirable tooling or method. In some illustrative examples, consolidation can be performed using at least one of CCM, stamp forming, or an autoclave. The consolidation is performed at a temperature higher than the second melting temperature of second thermoplastic material 714 and second thermoplastic material 716.

To join first composite component 702 and second composite component 710, a respective carbon conductive layer is positioned between each thermoplastic joining film of first composite component 702 and a respective thermoplastic joining film of second composite component 710. For example, carbon conductive layer 718 can be positioned between thermoplastic joining film 707 and thermoplastic joining film 715. Carbon conductive layer 720 can be positioned between thermoplastic joining film 709 and thermoplastic joining film 713.

Each of carbon conductive layer 718 and carbon conductive layer 720 can be used to heat respective portions of the second thermoplastic material to the second melting temperature to join first composite component 702 and second composite component 710 without melting first thermoplastic material 704 or third thermoplastic material 712. For example, carbon conductive layer 718 can be used to heat second thermoplastic material 716 and second thermoplastic material 706. As another example, carbon conductive layer 720 can be used to heat second thermoplastic material 708 and second thermoplastic material 714.

In these illustrative examples, each of thermoplastic joining film 707, thermoplastic joining film 709, thermoplastic joining film 713, and thermoplastic joining film 715 are described as being formed of the same second thermoplastic material. In some illustrative examples, at least one of thermoplastic joining film 707, thermoplastic joining film 709, thermoplastic joining film 713, or thermoplastic joining film 715 can be formed of a different type of thermoplastic material. Each of thermoplastic joining film 707, thermoplastic joining film 709, thermoplastic joining film 713, or thermoplastic joining film 715 can be formed of any desirable type of thermoplastic material configured to be compatible with first thermoplastic material 704 and third thermoplastic material 712. Each of thermoplastic joining film 707, thermoplastic joining film 709, thermoplastic joining film 713, or thermoplastic joining film 715 can be formed of any desirable type of thermoplastic material with a melting temperature lower than first melting temperature of first thermoplastic material 704 and third melting temperature of third thermoplastic material 712.

Figure 9:
FIG. 9 is an illustration of a cross-sectional view of two composite parts and conductive layers in accordance with an illustrative embodiment.
Figure 9:
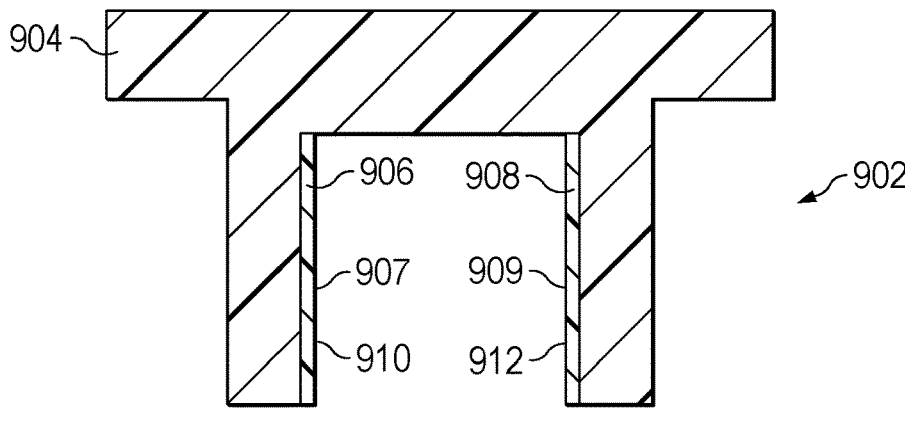
Figure 9:
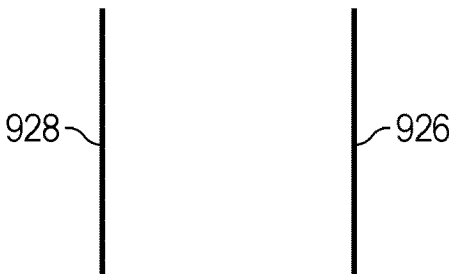
Figure 9:
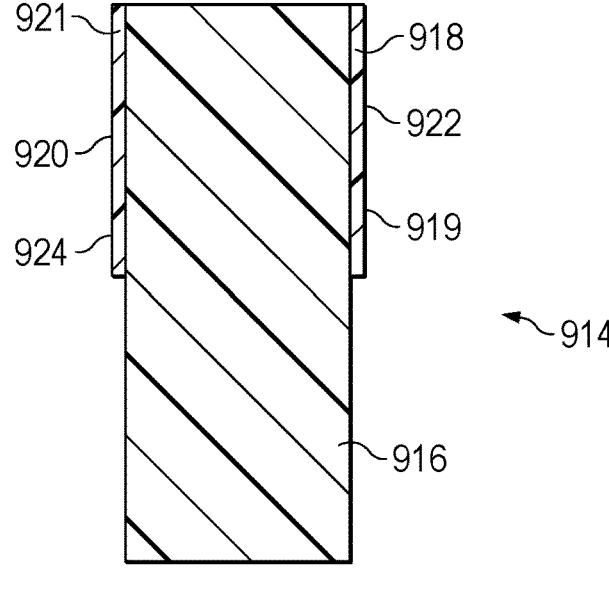
Figure 10:
FIG. 10 is an illustration of a cross-sectional view of joints formed between two composite parts using conductive layers in accordance with an illustrative embodiment.

The illustrative examples provide joining of a thermoplastic bracket/clip, first composite component 702, to the thermoplastic crossmember, second composite component 710. FIGS. 9-10 likewise depict joining of a thermoplastic bracket/clip, first composite component 902, to the thermoplastic crossmember, second composite component 914.

These joints can utilize a low melt PAEK joining film mechanism in the thermoplastic joining films. In some illustrative examples, both the bracket and crossmember will have the low melt PAEK film co-consolidated on the mating area of those two structures. In some illustrative examples, the processing temperature for consolidating the thermoplastic joining film to the respective composite component will take place at 375° C. +/−10° C.

In some illustrative examples, instead of having separate carbon conductive layers, To aid in keeping a tight thickness tolerance, the low melt PAEK film will be impregnated with a scrim to help maintain film layer thickness. The heating can follow a conductive heating approach. The heating can also result from having electrical elements at the bond line.

Figure 8:
FIG. 8 is an illustration of a cross-sectional view of joints formed between two composite parts using conductive layers in accordance with an illustrative embodiment.

Two types of bracket to crossmember mating configurations are depicted in these illustrative examples. One type is to have a tapering structure, as depicted in FIGS. 7-8. This taper will ensure that there is no gap between the bracket, first composite component 702, and the crossmember, second composite component 710 as any excess joining film will be squeezed out from that cavity as pressure and temperature are applied.

Turning now to FIG. 8, an illustration of a cross-sectional view of joints formed between two composite parts using conductive layers is depicted in accordance with an illustrative embodiment. View 800 is a view of joint 802 and joint 804 connecting first composite component 702 and second composite component 710. Joint 802 and joint 804 are formed through consolidation of first composite component 702 and second composite component 710. The consolidation of first composite component 702 and second composite component 710 comprises elevated temperature and pressure.

In this illustrative example, carbon conductive layer 718 has been used to heat second thermoplastic material 716 and second thermoplastic material 706 to the second melting temperature, and carbon conductive layer 720 has been used to heat second thermoplastic material 708 and second thermoplastic material 714 to the second melting temperature to form joint 802 and joint 804.

In some illustrative examples, heat is applied through carbon conductive layer 718 and carbon conductive layer 720 only. In some illustrative examples, additional heat can be supplied by conductive heating. Pressure for the consolidation can be provided by pressing second composite component 710 into first composite component 702.

Turning now to FIG. 9, an illustration of a cross-sectional view of two composite parts and conductive layers is depicted in accordance with an illustrative embodiment. In view 900, first composite component 902 and second composite component 914 are visible. First composite component 902 is a physical implementation of first composite component 204 of FIG. 2. Second composite component 914 is a physical implementation of second composite component 206 of FIG. 2.

First composite component 902 takes the form of a bracket. First composite component 902 comprises a plurality of layers of first thermoplastic material 904 and portions of a second thermoplastic material. First thermoplastic material 904 has a first melting temperature. In some illustrative examples, first thermoplastic material 904 is one of polyetherketoneketone (PEKK), polyetheretherketone (PEEK), or a blend of polyetheretherketone (PEEK) and polyetherketoneketone (PEKK). In some illustrative examples, first thermoplastic material 904 is polyaryletherketone. In this illustrative example, the portions of second thermoplastic material include second thermoplastic material 906 and second thermoplastic material 908.

Second thermoplastic material 906 and second thermoplastic material 908 have a second melting temperature. The second melting temperature is lower than the first melting temperature of first thermoplastic material 904.

Thermoplastic joining film 909 is formed by second thermoplastic material 908. Thermoplastic joining film 907 is formed by second thermoplastic material 906. Thermoplastic joining film 909 and thermoplastic joining film 907 can be used to form a joint between first composite component 902 and second composite component 914.

Second thermoplastic material 906 forms surface 910 of first composite component 902. Second thermoplastic material 908 forms surface 912 of first composite component 902. In this illustrative example, surface 910 and surface 912 are planar instead of tapered. To form surface 910, second thermoplastic material 906 was consolidated with first thermoplastic material 904. To form surface 912, second thermoplastic material 908 was consolidated with first thermoplastic material 904. The consolidation step can be performed by any desirable tooling or method. In some illustrative examples, consolidation can be performed using at least one of CCM, stamp forming, or an autoclave. The consolidation is performed at a temperature higher than the second melting temperature of second thermoplastic material 906 and second thermoplastic material 908.

Second composite component 914 comprises third thermoplastic material 916 and a second thermoplastic material. In this illustrative example, second composite component comprises second thermoplastic material 918 and second thermoplastic material 920. Second thermoplastic material 918 and second thermoplastic material 920 have the second melting temperature. The second melting temperature is lower than the third melting temperature of third thermoplastic material 916.

Thermoplastic joining film 922 is formed by second thermoplastic material 918. Surface 919 of second composite component 914 is formed by consolidating second thermoplastic material 918 and third thermoplastic material 916. In this illustrative example, Surface 919 and surface 924 are parallel.

Thermoplastic joining film 921 is formed by second thermoplastic material 920. Surface 924 of second composite component 914 is formed by consolidating second thermoplastic material 920 and third thermoplastic material 916. The consolidation step can be performed by any desirable tooling or method. In some illustrative examples, consolidation can be performed using at least one of CCM, stamp forming, or an autoclave. The consolidation is performed at a temperature higher than the second melting temperature of second thermoplastic material 918 and second thermoplastic material 920.

To join first composite component 902 and second composite component 914, a respective carbon conductive layer is positioned between each thermoplastic joining film of first composite component 902 and a respective thermoplastic joining film of second composite component 914. For example, carbon conductive layer 926 can be positioned between thermoplastic joining film 922 and Thermoplastic joining film 909. Carbon conductive layer 928 can be positioned between thermoplastic joining film 921 and thermoplastic joining film 907.

Each of carbon conductive layer 928 and carbon conductive layer 926 can be used to heat respective portions of the second thermoplastic material to the second melting temperature to join first composite component 902 and second composite component 914 without melting first thermoplastic material 904 or third thermoplastic material 916. For example, carbon conductive layer 928 can be used to heat second thermoplastic material 920 and second thermoplastic material 906. As another example, carbon conductive layer 926 can be used to heat second thermoplastic material 908 and second thermoplastic material 918.

In these illustrative examples, each of thermoplastic joining film 907, thermoplastic joining film 909, thermoplastic joining film 922, and Thermoplastic joining film 921 are described as being formed of the same second thermoplastic material. In some illustrative examples, at least one of thermoplastic joining film 907, thermoplastic joining film 909, thermoplastic joining film 922, or thermoplastic joining film 921 can be formed of a different type of thermoplastic material. Each of thermoplastic joining film 909, thermoplastic joining film 909, thermoplastic joining film 922, or Thermoplastic joining film 921 can be formed of any desirable type of thermoplastic material configured to be compatible with first thermoplastic material 904 and third thermoplastic material 916. Each of thermoplastic joining film 907, thermoplastic joining film 909, thermoplastic joining film 922, or thermoplastic joining film 921 can be formed of any desirable type of thermoplastic material with a melting temperature lower than first melting temperature of first thermoplastic material 904 and third melting temperature of third thermoplastic material 916.

This configuration provides a non-tapered joint structure. This non-tapered joint achieves joining film squeeze out from excess film material to ensure the all the gaps are closed.

Turning now to FIG. 10, an illustration of a cross-sectional view of joints formed between two composite parts using conductive layers is depicted in accordance with an illustrative embodiment. View 1000 is a view of joint 1002 and joint 1004 connecting first composite component 902 and second composite component 914. Joint 1002 and joint 1004 are formed through consolidation of first composite component 902 and second composite component 914. The consolidation of first composite component 902 and second composite component 914 comprises elevated temperature and pressure.

In this illustrative example, carbon conductive layer 926 has been used to heat second thermoplastic material 908 and second thermoplastic material 918 to the second melting temperature and carbon conductive layer 928 has been used to heat second thermoplastic material 920 and second thermoplastic material 906 to the second melting temperature to form joint 1002 and joint 1004.

In some illustrative examples, heat is applied through carbon conductive layer 926 and carbon conductive layer 928 only. In some illustrative examples, additional heat can be supplied by conductive heating. Pressure for the consolidation can be provided by an interference fit between second composite component 914 into first composite component 902.

Figure 11:
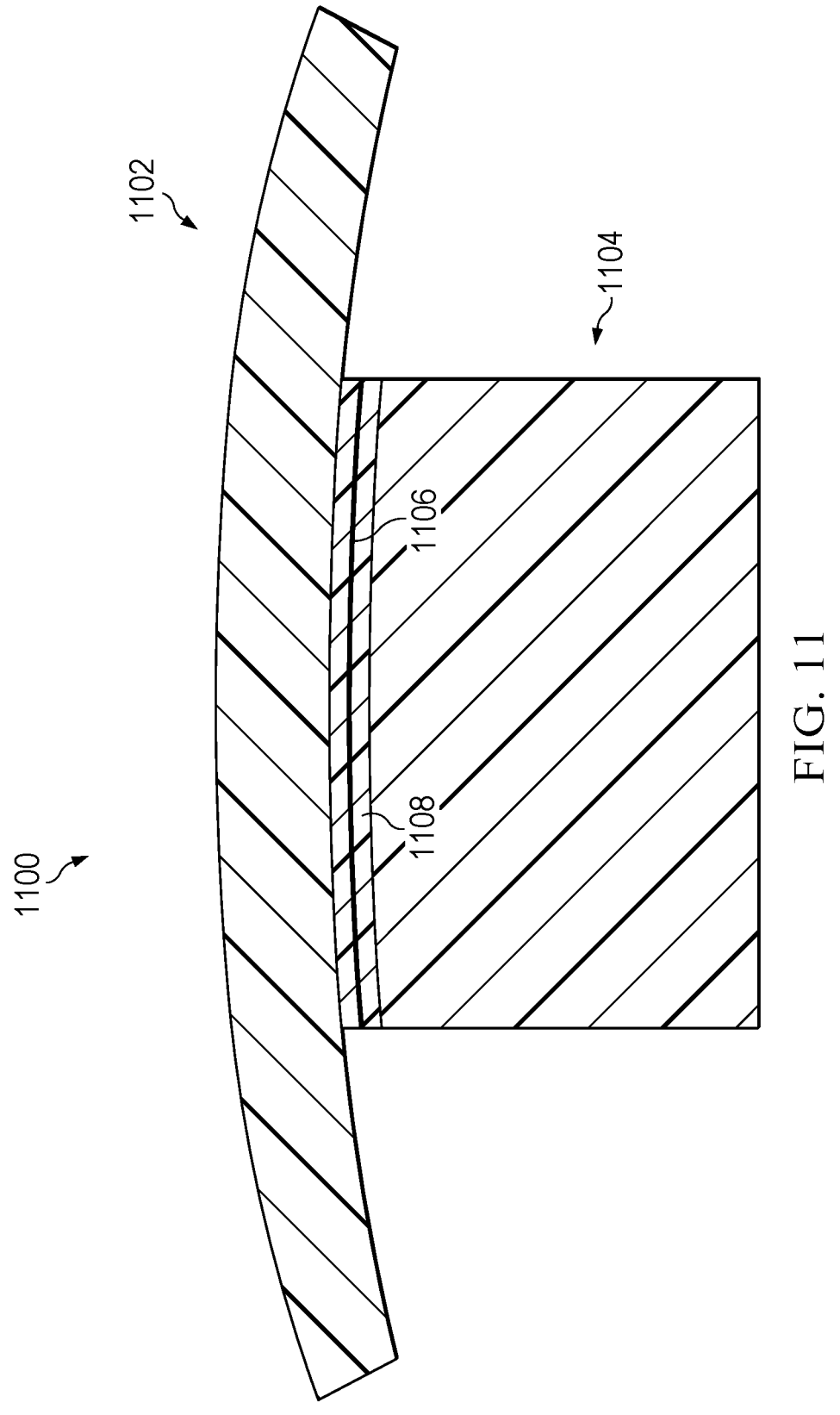
FIG. 11 is an illustration of a cross-sectional view of a joint formed between a thermoset composite part and a thermoplastic composite part using a conductive layer in accordance with an illustrative embodiment.

Turning now to FIG. 11, an illustration of a cross-sectional view of a joint formed between a thermoset composite part and a thermoplastic composite part using a conductive layer is depicted in accordance with an illustrative embodiment. In view 1100, first composite component 1102 is joined to second composite component 1104 by thermoplastic joining film 1106 having carbon conductive layer 1108. In some illustrative examples, first composite component 1102 is formed of a thermoset material. In this illustrative example, second composite component 1104 is formed of a thermoplastic material. Thermoplastic joining film 1106 is formed of a material having a second melting temperature lower than a first melting temperature of second composite component 1104.

Thermoplastic joining film 1106 can be applied between first composite component 1102 and second composite component 1104 in any desirable fashion. In some illustrative examples, thermoplastic joining film 1106 is consolidated onto first composite component 1102 before joining. In some illustrative examples, thermoplastic joining film 1106 is consolidated onto second composite component 1104 before joining. In some illustrative examples, The illustrative examples enable the efficient joining of epoxy thermoset skins (from either fuselage or wing structures) to PAEK thermoplastic substructure in the form of brackets and clips. This joint makes use a PAEK to epoxy joining mechanism utilizing a PAEK/PEI blend tie layer. Due to the softening mechanism involved with this tie layer, the proposed structure is configured to ensure proper mating between the constituent structures.

In the illustrative examples, the use of a PAEK/PEI thermoplastic joining film allows for polymer chain entanglement to occur between a thermoplastic and thermoset epoxy resins. An epoxy skin can be joined to a thermoplastic bracket or clip using a PAEK/PEI thermoplastic joining film. A thermoset skin can be either prepreg or resin infused, such as liquid molded or B-staged resin. Furthermore, the thermoset skin can be either co-bonded onto the thermoplastic bracket or it can be pre-cured and secondarily bonded onto the thermoplastic bracket by using an epoxy film adhesive. This joining can take place at the usual temperatures used to cure epoxy resins (350° F.+/−10° F.). The thermoplastic bracket can be stamp formed or compression molded with a layer of PAEK/PEI film on the surface. The use of PAEK/PEI thermoplastic joining film for co-bonding or secondarily bonding to the epoxy skin with epoxy film adhesive, no aggressive surface prep procedure on the thermoplastic bracket part will be performed. Reducing or eliminating aggressive surface prep procedures will reduce the cost and time of joining thermoset and thermoplastic components.

Figure 12A:
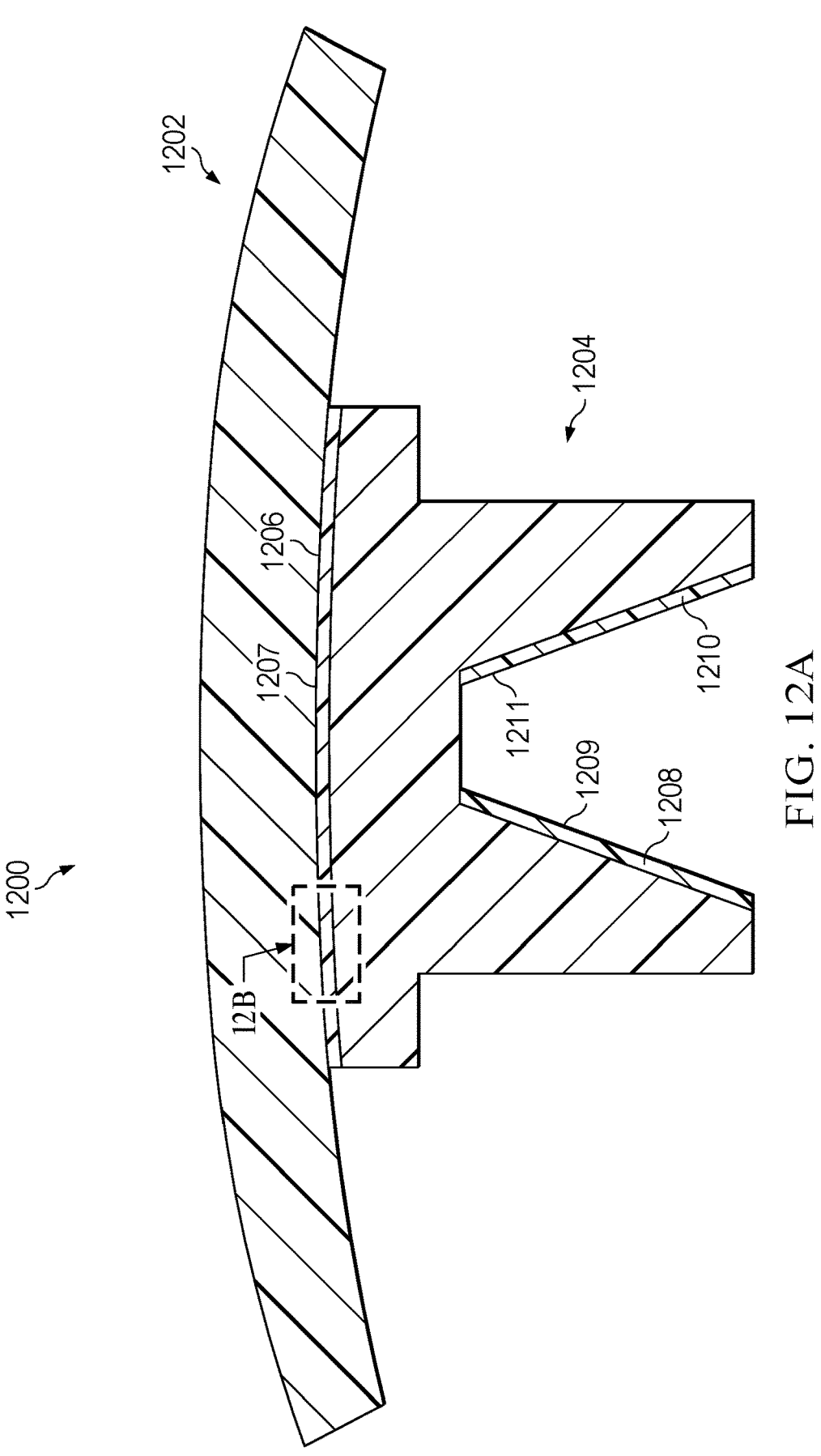
FIGS. 12A and 12B are an illustration of a cross-sectional view of a joint formed between a thermoset composite part and a thermoplastic composite part using a conductive layer in accordance with an illustrative embodiment.
Figure 12B:
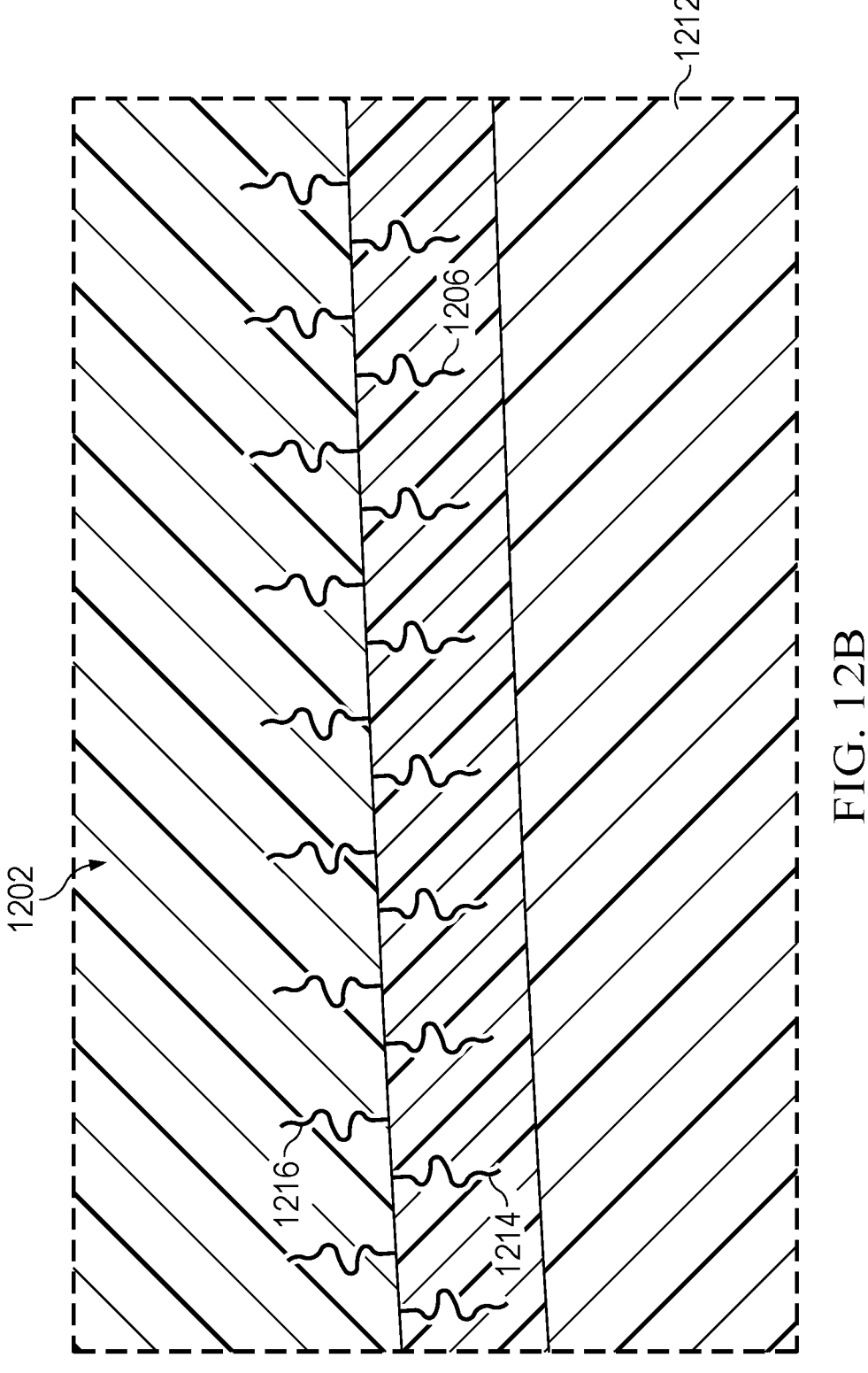

Turning now to FIGS. 12A and 12B, an illustration of a cross-sectional view of a joint formed between a thermoset composite part and a thermoplastic composite part using a conductive layer is depicted in accordance with an illustrative embodiment. In view 1200, first composite component 1202 is joined to second composite component 1204 by thermoplastic joining film 1206. In some illustrative examples, thermoplastic joining film 1206 is formed of a mixture of two different thermoplastic materials. In some illustrative examples, thermoplastic joining film 1206 is formed of a mixture of polyetherimide and a polyaryletherketone.

Thermoplastic joining film 1206 has a second melting temperature lower than a first melting temperature of first thermoplastic material 1212 forming second composite component 1204. In some illustrative examples, thermoplastic joining film 1206 has a glass transition temperature in the range of 140-220 degrees Celsius. In these illustrative examples, joining can be performed at a temperature in the range of 180-200 degrees Celsius to join first composite component 1202 and second composite component 1204. In some illustrative examples, first thermoplastic material 1212 is one of polyetherketoneketone (PEKK), polyetheretherketone (PEEK), or a blend of polyetheretherketone (PEEK) and polyetherketoneketone (PEKK). In some illustrative examples, first thermoplastic material 1212 is one of polyaryletherketone (PEKK), polyetheretherketone (PEEK), or a blend of polyetheretherketone (PEEK) and polyetherketoneketone (PEKK). In this illustrative example, thermoplastic joining film 1206 has been consolidated onto second composite component 1204.

As can be seen in the callout, thermoset material 1214 of first composite component 1202 has diffused into thermoplastic joining film 1206. As can be seen in the callout, thermoplastic material 1216 of thermoplastic joining film 1206 has diffused into first composite component 1202. To create diffusions of thermoset material 1214 of first composite component 1202 into thermoplastic joining film 1206, first composite component 1202 is provided in an uncured epoxy composite material, such as a liquid molded or B-staged resin. The epoxy composite material of first composite component 1202 is cured to form the diffusions.

Thermoplastic joining film 1206 joins first composite component 1202 and second composite component 1204 at joint 1207. In this illustrative example, first composite component 1202 is a thermoset material. In some illustrative examples, a carbon conductive layer (not depicted) is present in joint 1207 to heat thermoplastic joining film 1206 for forming joint 1207.

In this illustrative example, second composite component 1204 can be joined to another composite component. For example, second thermoplastic material 1208 forms thermoplastic joining film 1209 and second thermoplastic material 1210 forms thermoplastic joining film 1211. In some illustrative examples, second thermoplastic material 1208 and second thermoplastic material 1210 are the same as thermoplastic joining film 1206. In other illustrative examples, second thermoplastic material 1208 and second thermoplastic material 1210 are different from thermoplastic joining film 1206. In some illustrative examples, second thermoplastic material 1208 and second thermoplastic material 1210 comprises a polyaryletherketone. In some illustrative examples, the polyaryletherketone has a melting temperature in the range of 260-350 degrees Celsius.

In some illustrative examples, second composite component 1204 can be joined to a third composite component at thermoplastic joining film 1211 and thermoplastic joining film 1209. In some illustrative examples, second composite component 1204 is joined to a third composite component similar to second composite component 710 of FIGS. 7 and 8. In some illustrative examples, thermoplastic joining film 1211 and thermoplastic joining film 1209 can form joints like joint 802 and joint 804 of FIG. 8.

Figure 13A:
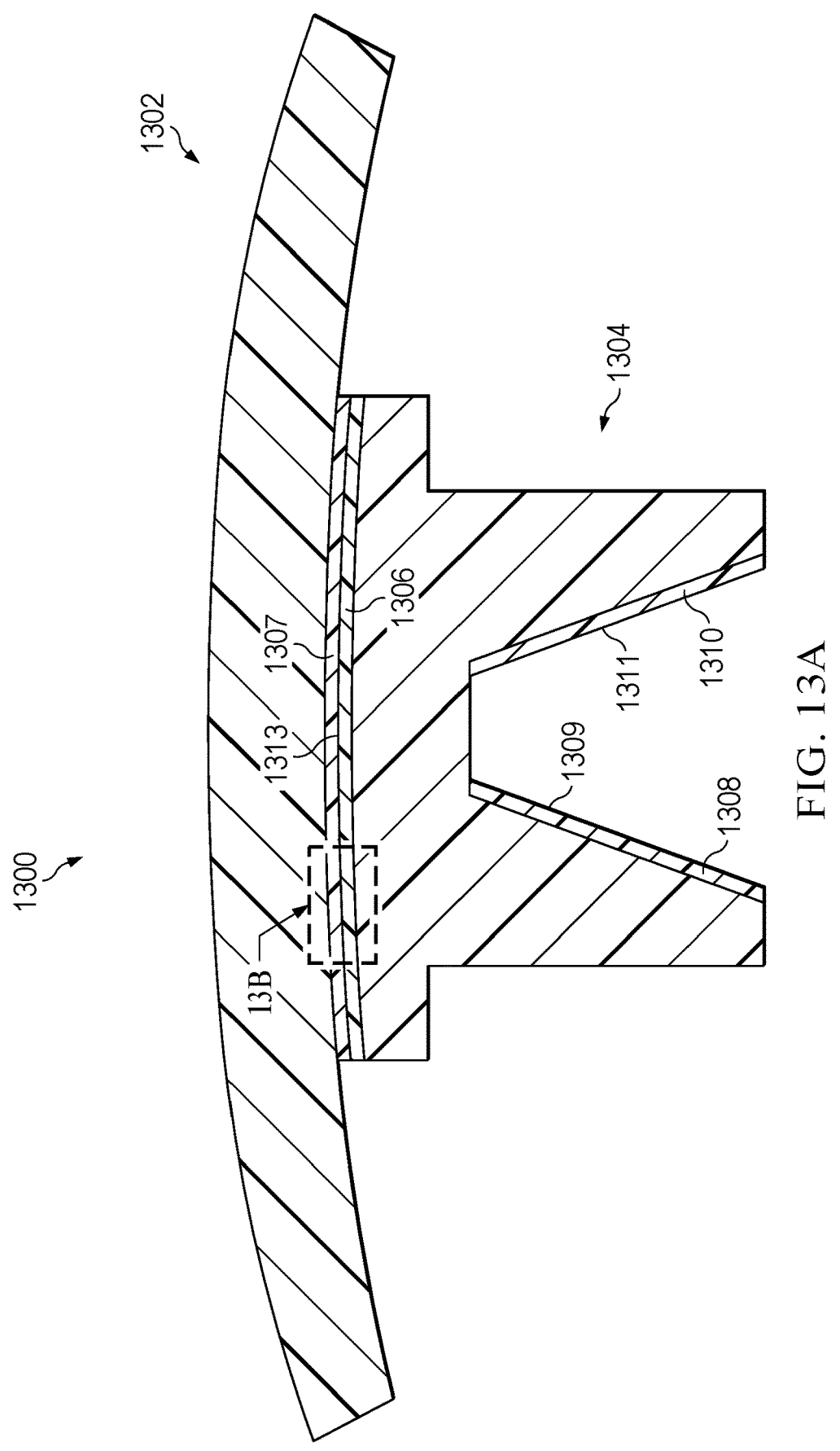
FIGS. 13A and 13B are an illustration of a cross-sectional view of a joint formed between a thermoset composite part and a thermoplastic composite part using a conductive layer in accordance with an illustrative embodiment.
Figure 13B:
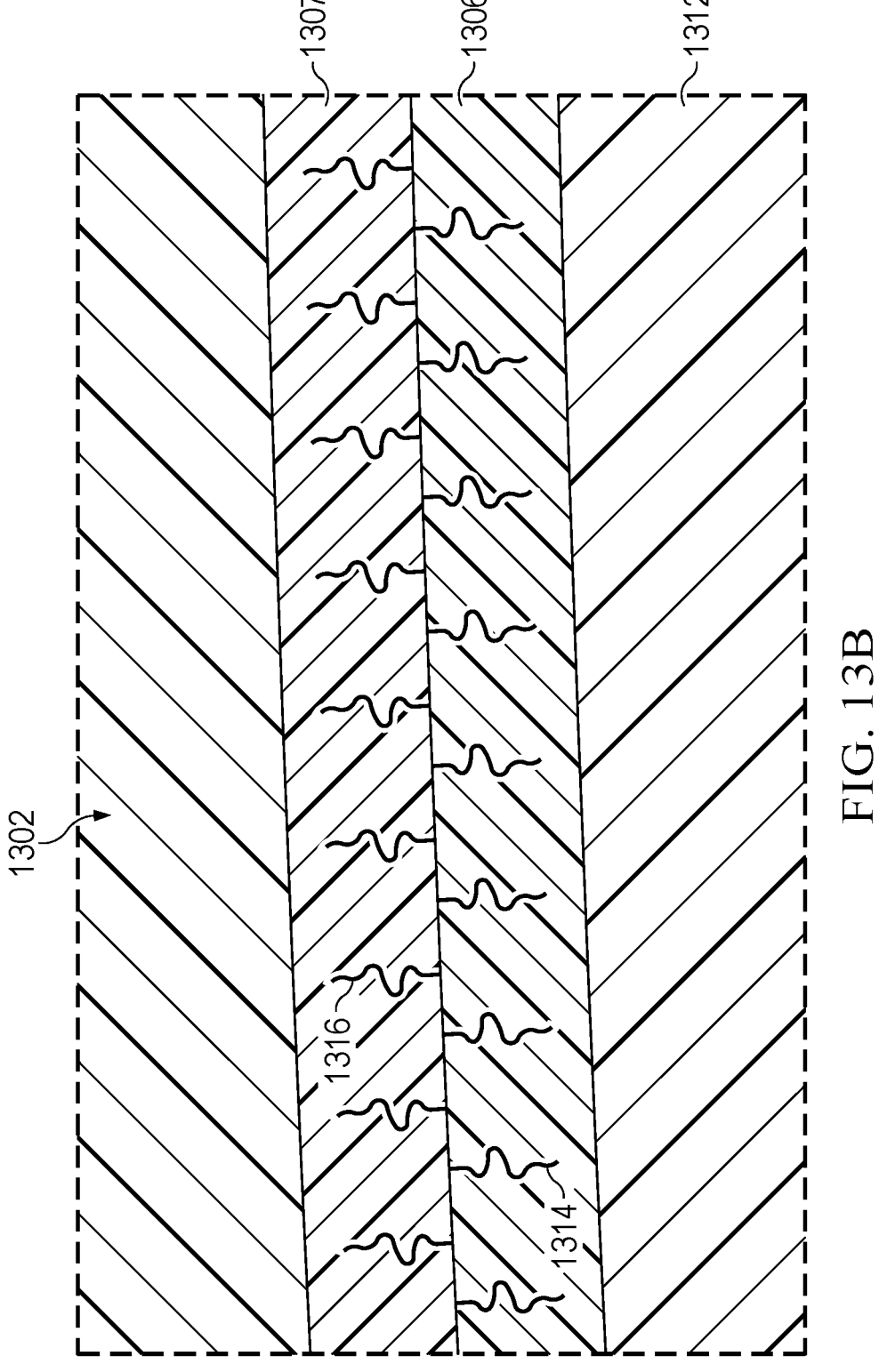

Turning now to FIGS. 13A and 13B, an illustration of a cross-sectional view of a joint formed between a thermoset composite part and a thermoplastic composite part using a conductive layer is depicted in accordance with an illustrative embodiment. In view 1300, first composite component 1302 is joined to second composite component 1304 by thermoplastic joining film 1306 and epoxy film adhesive 1307. In this illustrative example, first composite component 1302 is a thermoset material. Thermoplastic joining film 1306 and epoxy film adhesive 1307 form joint 1313 between first composite component 1302 and second composite component 1304. In some illustrative examples, a carbon conductive layer (not depicted) is present in joint 1313 to heat thermoplastic joining film 1306 for forming joint 1313.

Thermoplastic joining film 1306 has a second melting temperature lower than a first melting temperature of first thermoplastic material 1312 forming second composite component 1304. In some illustrative examples, thermoplastic joining film 1306 has a glass transition temperature in the range of 140-200 degrees Celsius. In some of these illustrative examples, joining can be performed at a temperature in the range of 140-200 degrees Celsius to join first composite component 1302 and second composite component 1304. In some illustrative examples, first thermoplastic material 1312 is one of polyetherketoneketone (PEKK), polyetheretherketone (PEEK), or a blend of polyetheretherketone (PEEK) and polyetherketoneketone (PEKK). In some illustrative examples, first thermoplastic material 1312 is polyaryletherketone. In this illustrative example, thermoplastic joining film 1306 has been consolidated onto second composite component 1304.

As can be seen in the callout, epoxy film adhesive 1307 has diffused 1314 into thermoplastic joining film 1306. As can be seen in the callout, thermoplastic material 1316 of thermoplastic joining film 1306 has diffused into epoxy film adhesive 1307.

In some illustrative examples, thermoplastic joining film 1306 is formed of a mixture of two different thermoplastic materials. In some illustrative examples, thermoplastic joining film 1306 is formed of a mixture of polyetherimide and a polyaryletherketone.

In this illustrative example, second composite component 1304 can be joined to another composite component. For example, second thermoplastic material 1308 forms thermoplastic joining film 1309 and second thermoplastic material 1310 forms thermoplastic joining film 1311. In some illustrative examples, second thermoplastic material 1308 and second thermoplastic material 1310 are the same as thermoplastic joining film 1306. In other illustrative examples, second thermoplastic material 1308 and second thermoplastic material 1310 are different from thermoplastic joining film 1306. In some illustrative examples, second thermoplastic material 1308 and second thermoplastic material 1310 comprises a polyaryletherketone. In some illustrative examples, the polyaryletherketone has a melting temperature in the range of 260-350 degrees Celsius.

In some illustrative examples, second composite component 1304 can be joined to a third composite component at thermoplastic joining film 1311 and thermoplastic joining film 1309. In some illustrative examples, second composite component 1304 is joined to a third composite component similar to second composite component 710 of FIGS. 7 and 8. In some illustrative examples, thermoplastic joining film 1311 and thermoplastic joining film 1309 can form joints like joint 802 and joint 804 of FIG. 8.

Figure 14A:
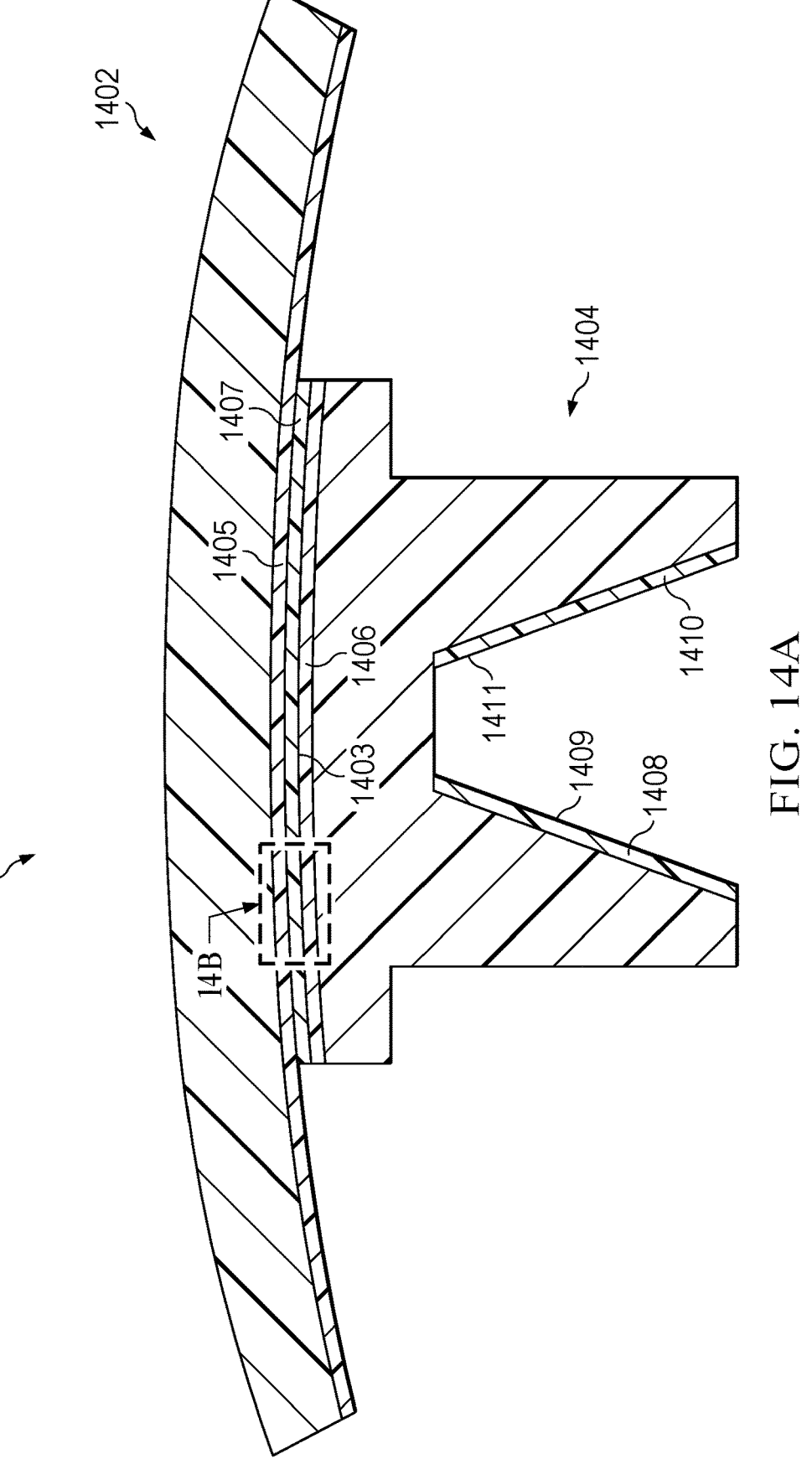
FIGS. 14A and 14B are an illustration of a cross-sectional view of a joint formed between a thermoset composite part and a thermoplastic composite part using a conductive layer in accordance with an illustrative embodiment.
Figure 14B:
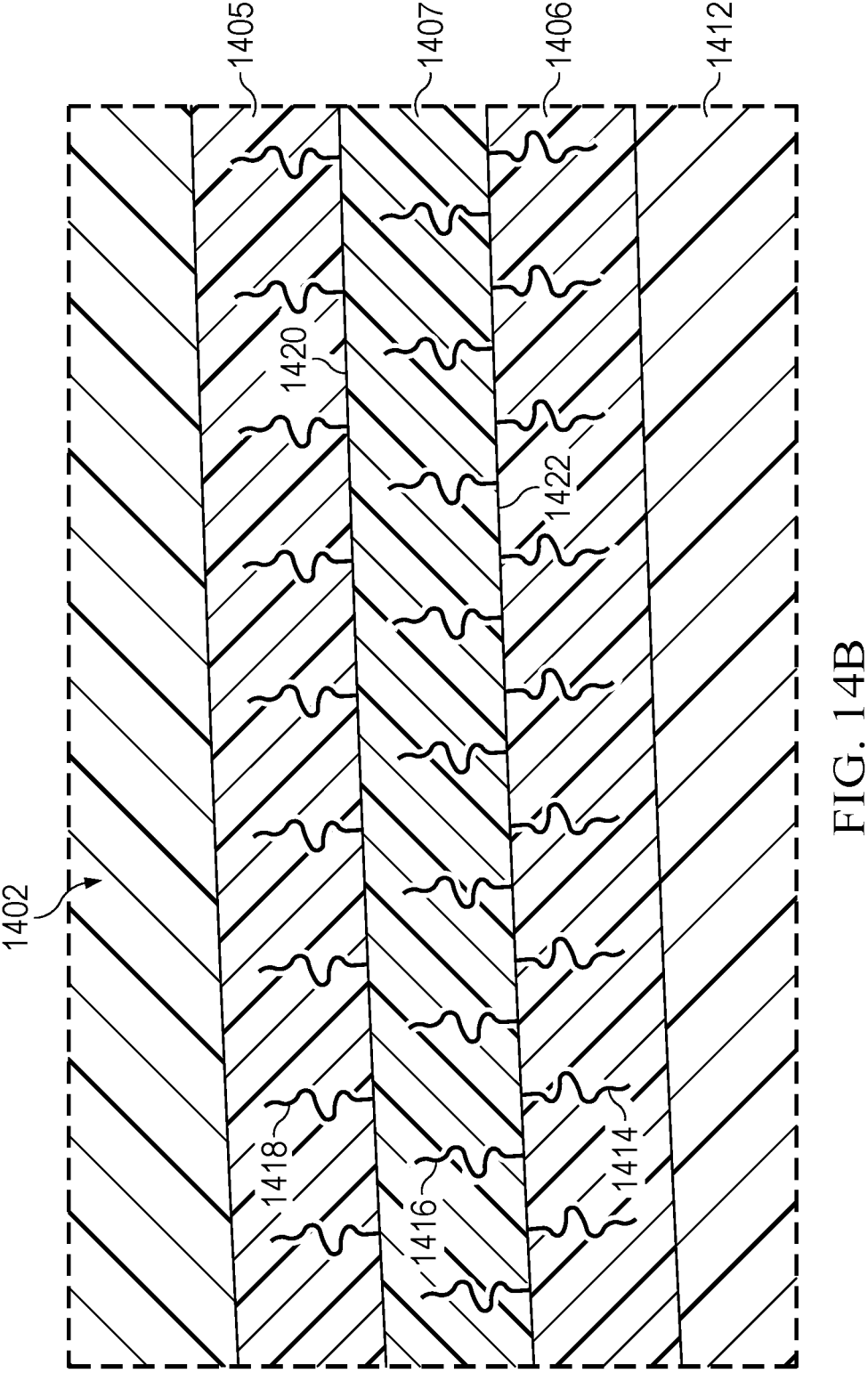

Turning now to FIGS. 14A and 14B, an illustration of a cross-sectional view of a joint formed between a thermoset composite part and a thermoplastic composite part using a conductive layer is depicted in accordance with an illustrative embodiment. In view 1400, first composite component 1402 is joined to second composite component 1404 by thermoplastic joining film 1405, thermoplastic joining film 1406, and one of either epoxy film adhesive or thermoplastic joining film 1407. Layer 1407 can take the form of either epoxy film adhesive or a thermoplastic joining film of a different composition than thermoplastic joining film 1405, thermoplastic joining film 1406. In some illustrative examples, thermoplastic joining film 1405 and thermoplastic joining film 1406 are a mixture of two different thermoplastic materials while thermoplastic joining film 1407 comprises a single thermoplastic material.

In this illustrative example, first composite component 1402 is a thermoset material. Joining film 1406, thermoplastic joining film 1405, and one of either epoxy film adhesive or thermoplastic joining film 1407 form joint 1403 between first composite component 1402 and second composite component 1404. In this illustrative example, thermoplastic joining film 1406 forms surface 1422 of second composite component 1404. In this illustrative example, thermoplastic joining film 1405 forms surface 1420 of first composite component 1402. In some illustrative examples, a carbon conductive layer (not depicted) is present in joint 1403 to heat thermoplastic joining film 1406 and thermoplastic joining film 1405 for forming joint 1403. When present in joint 1403, the carbon conductive layer can be present between thermoplastic joining film 1405 and thermoplastic joining film 1406, within thermoplastic joining film 1405, or within thermoplastic joining film 1406.

Thermoplastic joining film 1406 and thermoplastic joining film 1405 have a second melting temperature lower than a first melting temperature of first thermoplastic material 1412 forming second composite component 1404. In some illustrative examples, thermoplastic joining film 1406 has a glass transition temperature in the range of 140-220 degrees Celsius. In these illustrative examples, joining can be performed at a temperature in the range of 140-220 degrees Celsius to join first composite component 1402 and second composite component 1404. In some illustrative examples, first thermoplastic material 1412 is one of polyetherketoneketone (PEKK), polyetheretherketone (PEEK), or a blend of polyetheretherketone (PEEK) and polyetherketoneketone (PEKK). In some illustrative examples, first thermoplastic material 1412 is polyaryletherketone. In this illustrative example, thermoplastic joining film 1406 has been consolidated onto second composite component 1404.

In this illustrative example, thermoplastic joining film 1405 has been consolidated onto first composite component 1402.

As can be seen in the callout, one of either epoxy film adhesive or thermoplastic joining film 1407 has diffused 1414 into thermoplastic joining film 1406. One of either epoxy film adhesive or thermoplastic joining film 1407 has diffused 1418 into thermoplastic joining film 1405. As can be seen in the callout, thermoplastic material 1416 of thermoplastic joining film 1406 and thermoplastic joining film 1405 has diffused into one of either epoxy film adhesive or thermoplastic joining film 1407. When 1407 is a thermoplastic joining film, thermoplastic joining film 1407 diffuses into both thermoplastic joining film 1406 and thermoplastic joining film 1405. When 1407 is an epoxy film adhesive, epoxy film adhesive 1407 diffuses into both thermoplastic joining film 1406 and thermoplastic joining film 1405.

In some illustrative examples, at least one of thermoplastic joining film 1406 and thermoplastic joining film 1405 is formed of a mixture of two different thermoplastic materials. In some illustrative examples, at least one of thermoplastic joining film 1406 and thermoplastic joining film 1405 is formed of a mixture of polyetherimide and a polyaryletherketone.

In this illustrative example, second composite component 1404 can be joined to another composite component. For example, second thermoplastic material 1408 forms thermoplastic joining film 1409 and second thermoplastic material 1410 forms thermoplastic joining film 1411. In some illustrative examples, second thermoplastic material 1408 and second thermoplastic material 1410 are the same as thermoplastic joining film 1406. In other illustrative examples, second thermoplastic material 1408 and second thermoplastic material 1410 are different from thermoplastic joining film 1406. In some illustrative examples, second thermoplastic material 1408 and second thermoplastic material 1410 comprises a polyaryletherketone. In some illustrative examples, the polyaryletherketone has a melting temperature in the range of 260-350 degrees Celsius.

In some illustrative examples, second composite component 1404 can be joined to a third composite component at thermoplastic joining film 1411 and thermoplastic joining film 1409. In some illustrative examples, second composite component 1404 is joined to a third composite component similar to second composite component 710 of FIGS. 7 and 8. In some illustrative examples, thermoplastic joining film 1411 and thermoplastic joining film 1409 can form joints like joint 802 and joint 804 of FIG. 8.

Figure 15:
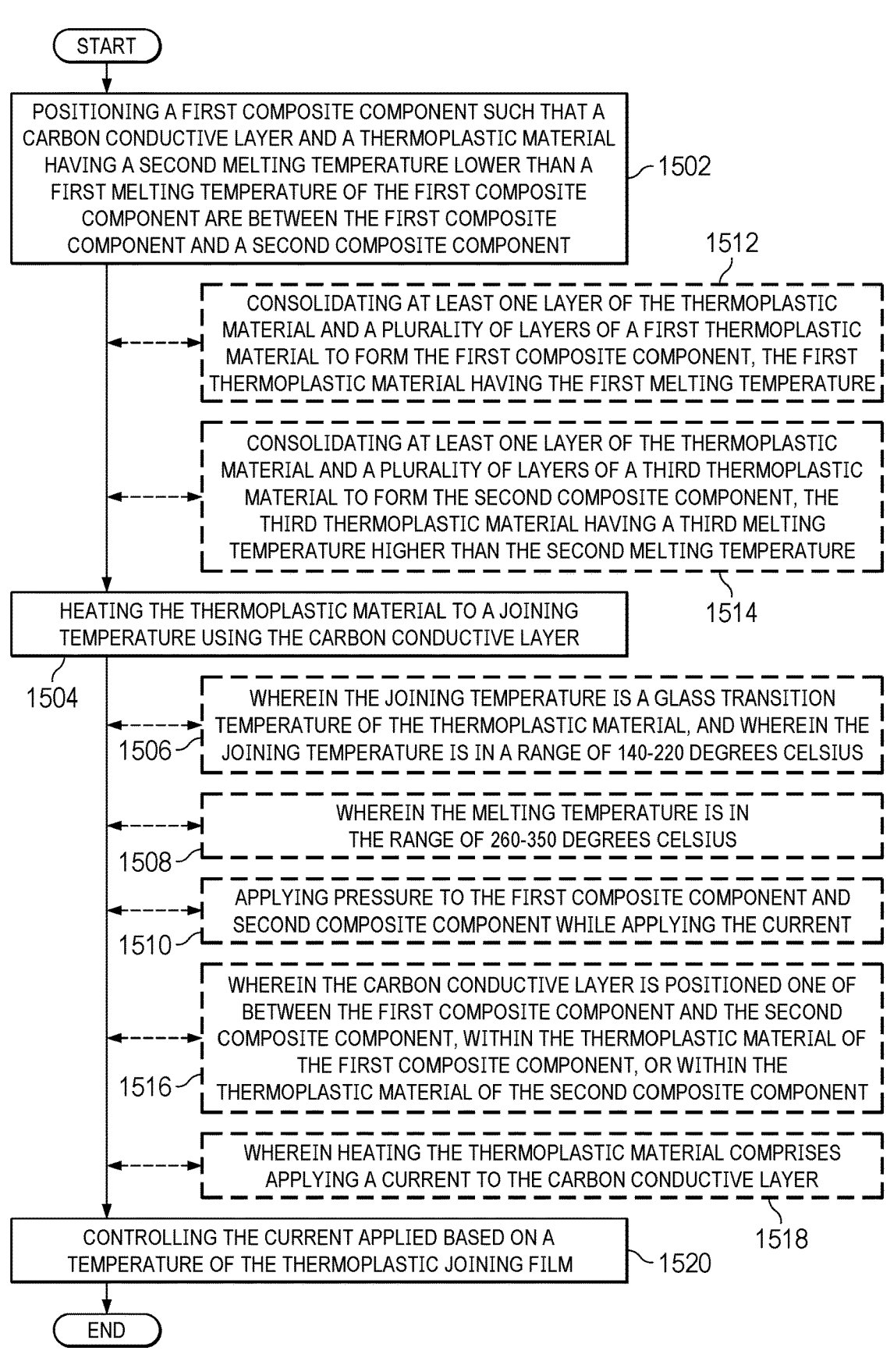
FIG. 15 is a flowchart of a method of forming a composite joint in accordance with an illustrative embodiment.

Turning now to FIG. 15, a flowchart of a method of forming a composite joint is depicted in accordance with an illustrative embodiment. Method 1500 can be performed in manufacturing environment 202 to form composite joint 200. Method 1500 can be performed on first composite component 302 and second composite component 304 of FIG. 3. Method 1500 can be performed on first composite component 402 and second composite component 404 of FIGS. 4 and 5. Method 1500 can be performed on plurality of stiffeners 602 and skin 604 of FIG. 6. Method 1500 can be performed on first composite component 702 and second composite component 710 of FIGS. 7 and 8. Method 1500 can be performed on first composite component 902 and second composite component 914 of FIGS. 9 and 10. Method 1500 can be performed on first composite component 1102 and second composite component 1104 of FIG. 11. Method 1500 can be performed on first composite component 1202 and second composite component 1204 of FIG. 12. Method 1500 can be performed on first composite component 1302 and second composite component 1304 of FIG. 13. Method 1500 can be performed on first composite component 1402 and second composite component 1404 of FIG. 14.

Method 1500 positions a first composite component such that a carbon conductive layer and a thermoplastic material having a second melting temperature lower than a first melting temperature of the first composite component are between the first composite component and a second composite component (operation 1502). Method 1500 heats the thermoplastic material to a joining temperature using the carbon conductive layer (operation 1504). Afterwards, method 1500 terminates.

In some illustrative examples, wherein the joining temperature is a glass transition temperature of the thermoplastic material, and wherein the joining temperature is in a range of 140-220 degrees Celsius (operation 1506). In some illustrative examples, the second melting temperature is in a range of 260-350 degrees Celsius (operation 1508).

In some illustrative examples, method 1500 applies pressure to the first composite component and second composite component while applying the current (operation 1510).

In some illustrative examples, method 1500 consolidates at least one layer of the thermoplastic material and a plurality of layers of a first thermoplastic material to form the first composite component, the first thermoplastic material having the first melting temperature (operation 1512). In some illustrative examples, method 1500 consolidates at least one layer of the thermoplastic material and a plurality of layers of a third thermoplastic material to form the second composite component, the third thermoplastic material having a third melting temperature higher than the second melting temperature (operation 1514).

In some illustrative examples, the carbon conductive layer is positioned one of between the first composite component and the second composite component, within the thermoplastic material of the first composite component, or within the thermoplastic material of the second composite component (operation 1516).

In some illustrative examples, heating the thermoplastic material comprises applying a current to the carbon conductive layer (operation 1518). In some illustrative examples, method 1500 controls the current applied based on a temperature of the thermoplastic joining film (operation 1520).

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

As used herein, "a number of," when used with reference to items means one or more items.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, operation 1506 through operation 1520 may be optional.

Figure 16:
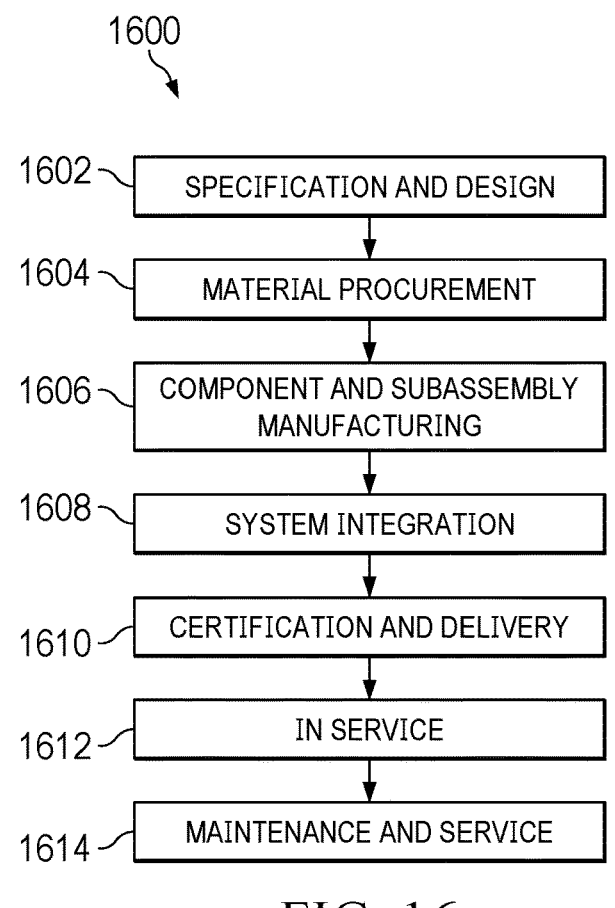
FIG. 16 is an illustration of an aircraft manufacturing and service method in a form of a block diagram in accordance with an illustrative embodiment.
Figure 17:
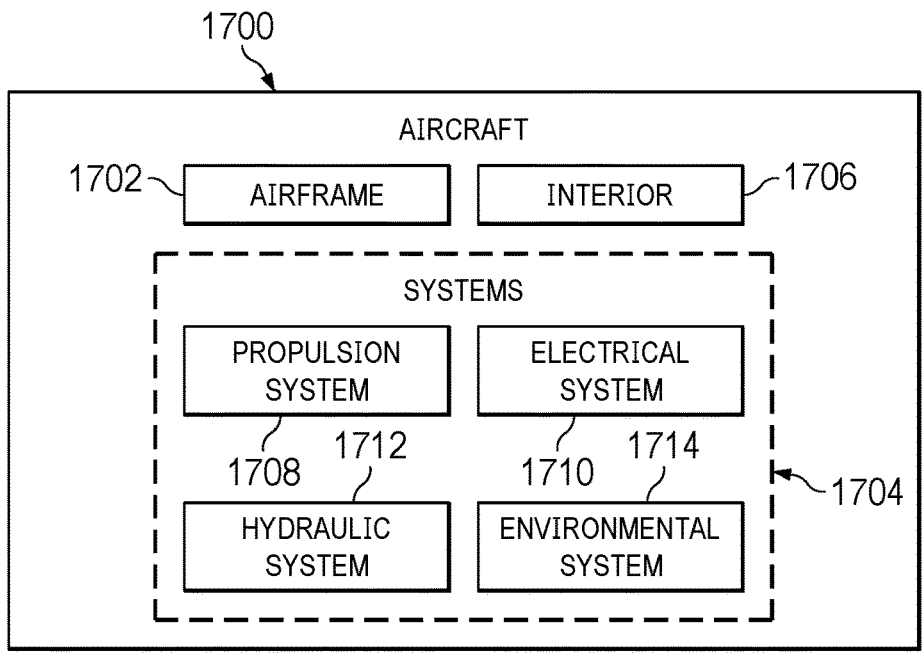
FIG. 17 is an illustration of an aircraft in a form of a block diagram in which an illustrative embodiment may be implemented.

Illustrative embodiments of the present disclosure may be described in the context of aircraft manufacturing and service method 1600 as shown in FIG. 16 and aircraft 1700 as shown in FIG. 17. Turning first to FIG. 16, an illustration of an aircraft manufacturing and service method in a form of a block diagram is depicted in accordance with an illustrative embodiment. During pre-production, aircraft manufacturing and service method 1600 may include specification and design 1602 of aircraft 1700 in FIG. 17 and material procurement 1604.

During production, component and subassembly manufacturing 1606 and system integration 1608 of aircraft 1700 takes place. Thereafter, aircraft 1700 may go through certification and delivery 1610 in order to be placed in service 1612. While in service 1612 by a customer, aircraft 1700 is scheduled for routine maintenance and service 1614, which may include modification, reconfiguration, refurbishment, or other maintenance and service.

Each of the processes of aircraft manufacturing and service method 1600 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 17, an illustration of an aircraft in a form of a block diagram is depicted in which an illustrative embodiment may be implemented. In this example, aircraft 1700 is produced by aircraft manufacturing and service method 1600 of FIG. 16 and may include airframe 1702 with plurality of systems 1704 and interior 1706. Examples of systems 1704 include one or more of propulsion system 1708, electrical system 1710, hydraulic system 1712, and environmental system 1714. Any number of other systems may be included.

Apparatuses and methods embodied herein may be employed during at least one of the stages of aircraft manufacturing and service method 1600. One or more illustrative embodiments may be manufactured or used during at least one of component and subassembly manufacturing 1606, system integration 1608, in service 1612, or maintenance and service 1614 of FIG. 16.

The illustrative examples provide joint designs and configurations utilizing solely thermoset and thermoplastic composite materials. The joints of the illustrative examples are possible through the use of low melt polyaryletherketone (PAEK) or low melt PAEK/polyetherimide (PEI) blends as joining films used within the subassembly structure. The joining films are applied at the interlayer of either thermoplastic composites or a thermoplastic and a thermoset composite joining surface and enables joining of the material through polymer chain diffusion.

The illustrative examples enable efficient design and manufacturing of thermoplastic to thermoset composite assemblies such as a thermoplastic stiffener to a thermoset skin. The illustrative examples enable efficient design and manufacturing of thermoplastic to thermoplastic composite assemblies such as a thermoplastic stiffener to a thermoplastic skin.

The illustrative examples provide for the use of the low melt PAEK and the PAEK/PEI joining films to bond epoxy to PAEK composite structures. The physical interaction will involve thermoplastic polymer chain diffusion between thermoplastic to thermoplastic mediums and also between thermoplastic to thermoset mediums. A combination of these two thermoplastic joining mechanisms will enable joint structures which do not rely on time sensitive surface treatments or the use of fastener type assemblies.

The illustrative examples provide the option of using direct heating of the low melt PAEK or the PAEK/PEI joining film interface via heating elements which eliminate the need to heat the whole structure. Utilizing localized heating elements bring greater flexibility to the assembly method. Not requiring use of an oven or heating through the structure, thus maintains integrity.

The illustrative examples provide the use of low melt PAEK and PAEK/PEI joining films. Both of these joining mechanisms are governed by thermoplastic polymer chain diffusion across different mediums. Another aspect provided by the illustrative examples is ensuring that the thermoplastic bracket and crossmember structures do not deconsolidate during joining. The selection of melting temperature of the joining films allows for joining without deconsolidation. This will be achieved through careful selection of the joining temperatures.

A final element of the proposed joint structure is to ensure that there is enough resin squeeze out upon mating the bracket and crossmember to ensure that there will be no gaps between those two components. These criteria also apply to joining scenarios involving epoxy, whether it may be the thermoplastic bracket and crossmember joining variant utilizing the PAEK/PEI joining film+epoxy film adhesive or for the joining of the epoxy skin to the thermoplastic bracket.

The thermoplastic joining films enable a cost effective approach of bonding thermoplastic composites to thermoset composites without relying on the use of mechanical fasteners which add weight. The thermoplastic joining films enable joining without oven or autoclave.

Carbon conductive layers can provide heating to the thermoplastic joining films. The carbon conductive layers can take the form of carbon mesh. Carbon mesh can provide joining of simple angles to shear panels, skins. The carbon conductive layers can be used for: Anti-buckle on shear panels; Skin-frame join (PI-join); Frame-frame join (single lap or double lap).

The low melt thermoplastic film can be provided either with embedded or surface placed conductive carbon layer. The conductive carbon layer (fly away) directly heats the low melt film adhesive. These joints are possible through the combined use of low melt PAEK and low melt PAEK/PEI blends as joining films used within the subassembly structure.

The composite components are joined with local compression. The illustrative examples can join hat flange to skin. The illustrative examples can join base of "L" stiffener to skin. Various ways have been provided to join spar to spar cap. Due to the softening mechanism involved with this tie layer, the proposed structure is optimized to ensure proper mating between the constituent structures.

The illustrative examples enable the efficient joining of epoxy thermoset skins (from either fuselage or wing structures) to PAEK thermoplastic substructure in the form of brackets and clips. This joint will make use of a PAEK to epoxy joining mechanism utilizing a PAEK/PEI blend tie layer. Lower-temp thermoplastic formulations provide for joining of high-temp thermoplastics without deconsolidation. Thermoplastic joining offers a physical bond of greater service and inspection integrity than chemical bonding with less surface preparation. New joint geometries can offer a self-tooled assembly step.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A composite joint comprising:
a first composite component formed of one of a thermoset material or a first thermoplastic material;
a second composite component formed of a thermoset material or a third thermoplastic material;
a thermoplastic joining film formed of a second thermoplastic material between the first composite component and the second composite component, the second thermoplastic material different from the thermoset material, first thermoplastic material, and third thermoplastic material, and wherein the first composite component is a stiffener and the second composite component is a skin; and
a carbon conductive layer in the thermoplastic joining film, wherein the carbon conductive layer is a one of a mesh, a coil, or a unidirectional tape or wherein the carbon conductive layer has a thickness in a range of 0.005" to 0.02".

2. The composite joint of claim 1, wherein the second thermoplastic material has a second melting temperature lower than a first melting temperature of the first thermoplastic material when the first composite component is formed of the first thermoplastic material, and wherein the second melting temperature is lower than a third melting temperature of the third thermoplastic material when the second composite component is formed of the third thermoplastic material.

3. The composite joint of claim 1, wherein the thermoplastic joining film comprises a polyaryletherketone.

4. The composite joint of claim 3, wherein the polyaryletherketone has a melting temperature in a range of 260-350 degrees Celsius.

5. The composite joint of claim 1, wherein the thermoplastic joining film has been consolidated into one of the first composite component or the second composite component.

6. The composite joint of claim 5 further comprising:
a second thermoplastic joining film in contact with the thermoplastic joining film, the second thermoplastic joining film consolidated into the other of the first composite component or the second composite component.

7. The composite joint of claim 1 further comprising:
a temperature sensor configured to monitor a temperature of the thermoplastic joining film; and a control system configured to control current applied to the carbon conductive layer based on the temperature of the thermoplastic joining film.

8. A composite joint comprising:
a first composite component comprising a plurality of layers of a first thermoplastic material and a first surface comprising a second thermoplastic material, the second thermoplastic material having a second melting temperature lower than a first melting temperature of the first thermoplastic material;
a second composite component comprising a plurality of layers of a third thermoplastic material and a second surface formed of the second thermoplastic material, the second melting temperature lower than a third melting temperature of the third thermoplastic material; and
a carbon conductive layer positioned one of between the first surface and the second surface, within the first surface, or within the second surface, wherein the carbon conductive layer is a one of a mesh, a coil, or a unidirectional tape or wherein the carbon conductive layer has a thickness in a range of 0.005" to 0.02".

9. The composite joint of claim 8, wherein the first thermoplastic material is one of polyetherketoneketone, polyetheretherketone, or a mixture of polyetheretherketone and polyetherketoneketone.

10. The composite joint of claim 8, wherein the second thermoplastic material comprises a polyaryletherketone.

11. The composite joint of claim 10, wherein the polyaryletherketone has a melting temperature in a range of 260-350 degrees Celsius.

12. The composite joint of claim 8, wherein the first composite component is a stiffener and the second composite component is a skin.

13. A composite component comprising:
a plurality of layers of a first thermoplastic material;
a first surface formed of a thermoplastic joining film comprising a second thermoplastic material consolidated onto the plurality of layers of the first thermoplastic material, the second thermoplastic material having a second melting temperature lower than a first melting temperature of the first thermoplastic material;
an additional surface formed of an additional thermoplastic joining film having a different composition than the thermoplastic joining film, the additional thermoplastic joining film consolidated onto the plurality of layers of the first thermoplastic material, the additional thermoplastic joining film having a respective melting temperature lower than the first melting temperature; and
a carbon conductive layer in the thermoplastic joining film and an additional carbon conductive layer in the additional thermoplastic joining film, wherein each carbon conductive layer is a one of a mesh, a coil, or a unidirectional tape or wherein each carbon conductive layer has a thickness in a range of 0.005" to 0.02".

14. A composite joint comprising:
a first composite component formed of one of a thermoset material or a first thermoplastic material;
a second composite component formed of a thermoset material or a third thermoplastic material;
a thermoplastic joining film formed of a second thermoplastic material between the first composite component and the second composite component, the second thermoplastic material different from the thermoset material, first thermoplastic material, and third thermoplastic material; and a carbon conductive layer in the thermoplastic joining film, wherein the carbon conductive layer is a one of a mesh, a coil, or a unidirectional tape or wherein the carbon conductive layer has a thickness in a range of 0.005" to 0.02";

a temperature sensor configured to monitor a temperature of the thermoplastic joining film; and a control system configured to control current applied to the carbon conductive layer based on the temperature of the thermoplastic joining film.

15. A method of forming a composite joint comprising:

providing a first composite component formed of one of a thermoset material or a first thermoplastic material and a second composite component formed of a thermoset material or a third thermoplastic material, wherein the first composite component is a stiffener and the second composite component is a skin;

positioning the first composite component such that a carbon conductive layer and a thermoplastic joining film formed of a second thermoplastic material having a second melting temperature lower than a first melting temperature of the first composite component are between the first composite component and a second composite component; and heating the second thermoplastic material to a joining temperature using the carbon conductive layer, wherein the carbon conductive layer is a one of a mesh, a coil, or a unidirectional tape or wherein the carbon conductive layer has a thickness in a range of 0.005" to 0.02".

16. The method of claim 15, wherein the joining temperature is a glass transition temperature of the second thermoplastic material, and wherein the joining temperature is in a range of 140-220 degrees Celsius.

17. The method of claim 15, wherein the second melting temperature is in a range of 260-350 degrees Celsius.

18. The method of claim 15 further comprising:

applying pressure to the first composite component and second composite component while applying a current to the carbon conductive layer.

19. The method of claim 15 further comprising:

consolidating at least one layer of the second thermoplastic material and a plurality of layers of the first thermoplastic material to form the first composite component, the first thermoplastic material having the first melting temperature.

20. The method of claim 19 further comprising:

consolidating at least one layer of the second thermoplastic material and a plurality of layers of the third thermoplastic material to form the second composite component, the third thermoplastic material having a third melting temperature higher than the second melting temperature.

21. The method of claim 20, wherein the carbon conductive layer is positioned one of between the first composite component and the second composite component, within the first thermoplastic material of the first composite component, or within the third thermoplastic material of the second composite component.

22. The method of claim 15, wherein heating the second thermoplastic material comprises applying a current to the carbon conductive layer.

23. The method of claim 22 further comprising:

controlling the current applied based on a temperature of the thermoplastic joining film.

* * * * *